(12) United States Patent
Tsao et al.

(10) Patent No.: US 10,978,091 B2
(45) Date of Patent: Apr. 13, 2021

(54) SYSTEM AND METHODS FOR SUPPRESSION BY SELECTING WAVELETS FOR FEATURE COMPRESSION IN DISTRIBUTED SPEECH RECOGNITION

(71) Applicant: ACADEMIA SINICA, Taipei (TW)

(72) Inventors: Yu Tsao, Taipei (TW); Syu-Siang Wang, Taipei (TW)

(73) Assignee: ACADEMIA SINICA, Taipei (TW)

( * ) Notice: Subject to any disclaimer, the term of this patent is extended or adjusted under 35 U.S.C. 154(b) by 136 days.

(21) Appl. No.: 16/205,328

(22) Filed: Nov. 30, 2018

(65) Prior Publication Data
US 2019/0287551 A1     Sep. 19, 2019

Related U.S. Application Data

(60) Provisional application No. 62/644,660, filed on Mar. 19, 2018.

(51) Int. Cl.
*G10L 25/69*     (2013.01)
*G06F 40/20*     (2020.01)
(Continued)

(52) U.S. Cl.
CPC .............. *G10L 25/06* (2013.01); *G10L 15/02* (2013.01); *G10L 15/22* (2013.01); *G10L 15/30* (2013.01); *G10L 25/03* (2013.01)

(58) Field of Classification Search
CPC ... G10L 25/69; G10L 2021/065; G06F 40/20; G08G 1/0104
(Continued)

(56) References Cited

U.S. PATENT DOCUMENTS

| 6,804,651 B2* | 10/2004 | Juric .................... G10L 25/69 |
|---|---|---|
| | | 381/120 |
| 2003/0187638 A1* | 10/2003 | Causevic .......... G06K 9/00516 |
| | | 704/226 |

(Continued)

OTHER PUBLICATIONS

Xing He et al., "An enhanced psychoacoustic model based on the discrete wavelet packet transform"; accepted Jul. 26, 2006, pp. 738-755, Journal of the Franklin Institute 343 (2006).

*Primary Examiner* — Farzad Kazeminezhad
(74) *Attorney, Agent, or Firm* — WPAT, PC

(57) ABSTRACT

A system is provided to realize suppression by selecting wavelets for feature compression in distributed speech recognition. The system comprises a first device and a second device. The first device comprising: a first network module for connecting to a network; an acoustic transducer module for recording speech and outputting frames of recorded signal; and a first processor configured for the following: extracting multiple-dimensional speech features from the frames of the recorded signal to generate multiple feature sequences; applying discrete wavelet transform (DWT) to the feature sequences to obtain a plurality of component data; and transmitting at least one of the plurality of component data via the network, wherein another one of the plurality of component data is not transmitted. The second device comprising: a second network module for connecting to the network and receiving the at least one of the plurality of component data from the first device; and a second processor configured for the following: updating the received data to generate an updated data; and applying inverse discrete wavelet transform (IDWT) to the updated data to obtain reconstructed speech data.

17 Claims, 12 Drawing Sheets

(51) Int. Cl.

|  |  |
|---|---|
| *G08G 1/01* | (2006.01) |
| *G10L 21/02* | (2013.01) |
| *G10L 25/06* | (2013.01) |
| *G10L 15/30* | (2013.01) |
| *G10L 15/22* | (2006.01) |
| *G10L 15/02* | (2006.01) |
| *G10L 25/03* | (2013.01) |

(58) Field of Classification Search
 USPC .................. 381/120; 704/270, 226; 701/117
 See application file for complete search history.

(56) References Cited

U.S. PATENT DOCUMENTS

| | | | |
|---|---|---|---|
| 2004/0030556 A1* | 2/2004 | Bennett | ................... G06F 40/20 704/270 |
| 2006/0064233 A1* | 3/2006 | Adachi | ................ G08G 1/0104 701/117 |
| 2016/0240190 A1 | 8/2016 | Lee et al. | |

\* cited by examiner

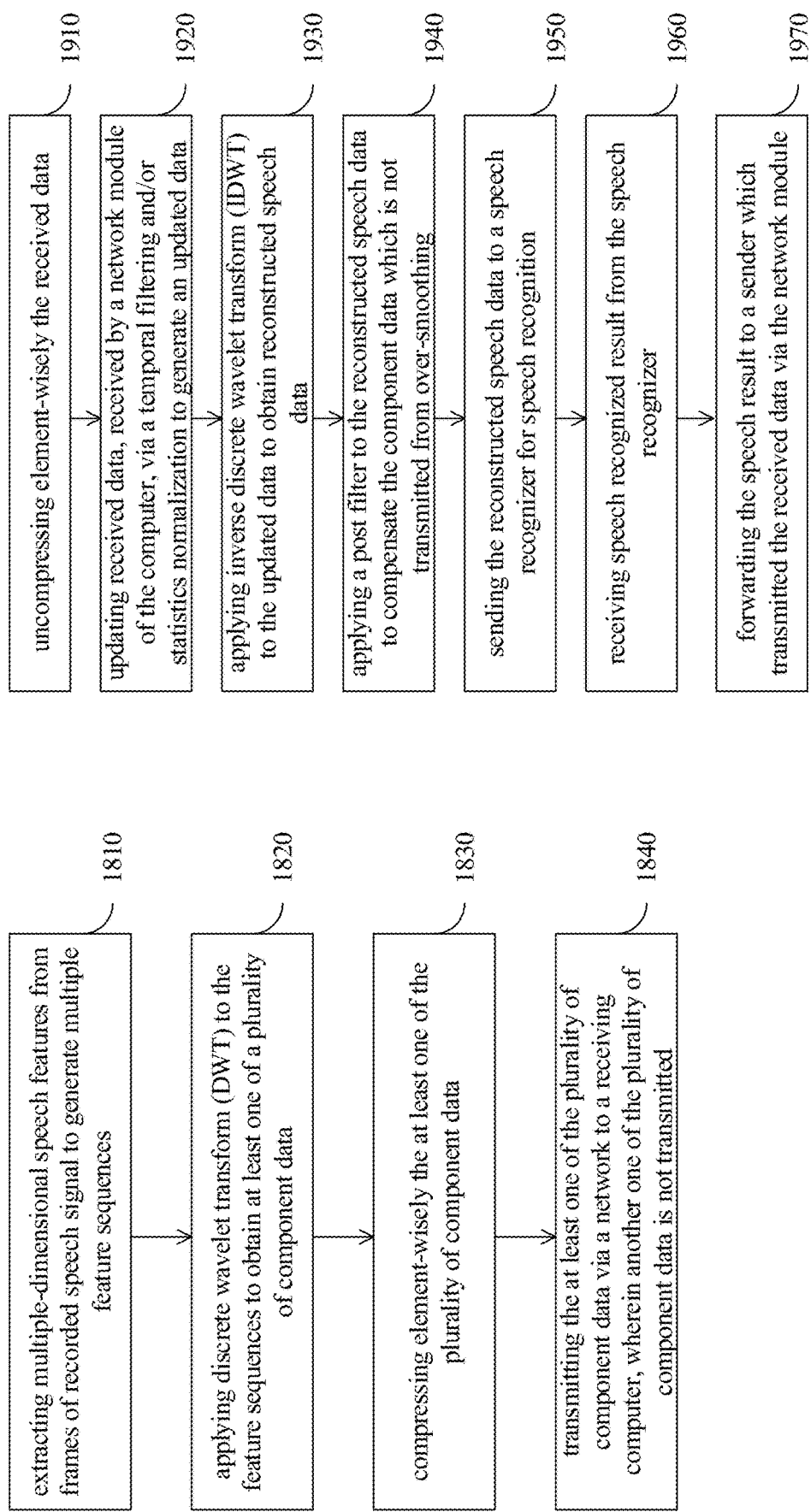

SYSTEM AND METHODS FOR SUPPRESSION BY SELECTING WAVELETS FOR FEATURE COMPRESSION IN DISTRIBUTED SPEECH RECOGNITION

CROSS REFERENCE TO RELATED APPLICATIONS

This application claims priority to provisional patent application, 62/644,660, filed on Mar. 19, 2018, the disclosure of which is incorporated herein by reference.

BACKGROUND OF THE INVENTION

1. Field of the Invention

The present invention relates to distributed speech recognition, and more particularly, to system and methods for suppression by selecting wavelets for feature compression in distributed speech recognition.

2. Description of the Prior Art

I. INTRODUCTION

Speech recognition is an essential component of the user interface. As mobile devices become smaller, distributed speech recognition (DSR) has become increasingly important since complex recognition tasks are often difficult to perform due to restrictions in computing power, access speed, memory capacity, and battery energy [1]-[3]. To handle these resource limitations, packet-based DSR system utilize a client-server architecture [4]-[7] and follow the European Telecommunications Standard Institute (ETSI) standard [8], which defines the standard feature extraction and compression algorithms to reduce the transmission bandwidth. The front-end is responsible for extracting and compressing the speech features prior to transmitting over a wireless channel. In the back-end, the features are recovered for decoding and recognition on a powerful server. Conducting speech feature compression on the mobile device only requires a small portion of the overall computation and storage, and can improve data channels by reducing bandwidth and frame-rates. However, performance of even the best current stochastic recognizers degrades in unexpected environments. Therefore, designing a compact representation of speech that contains the most discriminative information for pattern recognition while also reducing computational complexity has been a challenge. In addition, with upcoming applications that aim to combine speech with even more diverse features from multimodal inputs [9]-[12], determining a practical compression scheme remains a priority. Briefly speaking, there are two main goals for DSR systems: selecting a representation that is robust while also improving the data transmission efficiency.

For the first goal, articulatory features incorporate the events and dynamics [13], while filter-bank (FBANK) [14], Mel-frequency cepstral coefficients (MFCCs) [15], extended-least-square-based robust complex analysis [16], and power normalized cepstral coefficients (PNCC) [17] are designed to allow the suppression of insignificant variability in the higher-frequency regions. Qualcomm-ICSI-OGI (QIO) features [18] are extracted based on spectral and temporal processing with data compression for client-server systems. Most features are generated by converting the signal into a stream of vectors with a fixed frame rate [19]. These initial features can generally exhibit high discriminating capabilities in quiet settings, however environmental mismatches caused by background noise, channel distortions, and speaker variations can degrade the performance [20]. Therefore, noise compression methods are used to produce more robust representation on either normalizing the distributions of a feature stream [13], [21] or extracting speech-dominant components at specific modulation frequencies [22], [23]. Approaches that regulate the statistical moments, which are the expected value of a random variable to any specified power corresponding to the long-term temporal feature sequence, including mean subtraction (MS) [24], mean and variance normalization (MVN) [25], histogram equalization (HEQ) [26], and higher order cepstral moment normalization (HOCMN) [27]. Approaches that filter the time trajectories of the features to emphasize the slowly time-varying components and to reduce spectral coloration include RelActive SpecTrA (RASTA) [28], MVN plus-auto-regression moving average filtering (MVA) [29], and temporal structure normalization (TSN) [30]. Approaches that alleviate the noise effects in the modulation spectrum include special histogram equalization (SHE) [31], modulation spectrum control (MSC) [32], and modulation spectrum replacement (MSR) [33].

For the secondary goal of the DSR front-end to efficiently forward the data to the remote network, source coding techniques reduce the number of bits during transmission over bandwidth-limited channels and have benefitted real-time voice response services [34]. Approaches based on vector quantization (VQ) [35], [36] split each feature vector on the client side into sub-vectors to quantize via a specified codebook, and include split VQ (SVQ) [37], [38], Gaussian mixture model-based block quantization [34], and histogram-based quantization [39]. Approaches based on variable frame rates [40], [41] select frames according to the speech signal characteristics in order to decrease the number of frames required to represent each front-end feature prior to transmission to back-end recognizers. For example, the Euclidean distance can be calculated between the neighboring frames of the current frame to determine whether to preserve or discard the frame if the measure is smaller than a weighted threshold [42]-[44]. Methods for threshold derivation include a posteriori signal-to-noise ratio (SNR) weighted energy [45] and an energy weighted cepstral distance [46].

From the above it is clear that prior art still has shortcomings. In order to solve these problems, efforts have long been made in vain, while ordinary products and methods offering no appropriate structures and methods. Thus, there is a need in the industry for a novel technique that solves these problems.

SUMMARY OF THE INVENTION

Distributed speech recognition (DSR) splits the processing of data between a mobile device and a network server. In the front-end, features are extracted and compressed to transmit over a wireless channel to a back-end server, where the incoming stream is received and reconstructed for recognition tasks. In this application, we propose a feature compression algorithm termed suppression by selecting wavelets (SSW) for DSR: minimizing memory and device requirements while also maintaining or even improving the recognition performance. The SSW approach first applies the discrete wavelet transform (DWT) to filter the incoming speech feature sequence into two temporal sub-sequences at the client terminal. Feature compression is achieved by keeping the low (modulation) frequency sub-sequence while discarding the high frequency counterpart. The low-frequency sub-sequence is then transmitted across the remote network for specific feature statistics normalization. Wavelets are favorable for resolving the temporal properties of the feature sequence, and the down-sampling process in DWT reduces the amount of data at the terminal prior to transmission across the network, which can be interpreted as data compression. Once the compressed features have arrived at the server, the feature sequence can be enhanced by statistics normalization, reconstructed with inverse DWT, and compensated with a simple post filter to alleviate any over-smoothing effects from the compression stage. Results on a standard robustness task (Aurora-4) and on a Mandarin Chinese new corpus (MATBN) showed SSW outperforms conventional noise-robustness techniques while also providing nearly a 50% compression rate during the transmission stage of DSR system.

In accordance with an embodiment, the present application provides a system to realize suppression by selecting wavelets for feature compression in distributed speech recognition. The system comprises a first device and a second device. The first device comprising: a first network module for connecting to a network; an acoustic transducer module for recording speech and outputting frames of recorded signal; and a first processor configured for the following: extracting multiple-dimensional speech features from the frames of the recorded signal to generate multiple feature sequences; applying discrete wavelet transform (DWT) to the feature sequences to obtain a plurality of component data; and transmitting at least one of the plurality of component data via the network, wherein another one of the plurality of component data is not transmitted. The second device comprising: a second network module for connecting to the network and receiving the at least one of the plurality of component data from the first device; and a second processor configured for the following: updating the received data to generate an updated data; and applying inverse discrete wavelet transform (IDWT) to the updated data to obtain reconstructed speech data.

In this embodiment, in order to prevent over-smoothing problem occurred in the reconstructed speech data, the second processor is further configured for applying a post filter to the reconstructed speech data to compensate the component data which is not transmitted from over-smoothing.

In this embodiment, in order to recognize words in the recorded signal, the system further comprises a speech recognizer for receiving the reconstructed speech data from the second device and outputting speech recognized result to the first device via the network.

In this embodiment, in order to save transmission bandwidth between the first and the second devices and process complexity, the plurality of component data comprises low-frequency modulation component (LFC) data and high-frequency modulation (HFC) data, wherein the LFC data is transmitted and the HFC data is not transmitted.

In this embodiment, in order to save transmission bandwidth between the first and the second devices and process complexity, some of the plurality of component data are transmitted and the others of the plurality of component data are not transmitted.

In this embodiment, in order to realize the DWT and the corresponding IDWT processes using one pair of filters, wherein the DWT further comprises: passing the feature sequences through a low-pass analysis filter to generate analyzed low-frequency modulation (LFC) data; and down-sampling the analyzed LFC data with a factor of two to generate the at least one of the plurality of component data, and wherein the IDWT further comprises: up-sampling the updated data with a factor of two to generate up-sampling updated data; and passing the up-sampling updated data through a low-pass synthesis filter to obtain the reconstructed speech data, wherein the low-pass synthesis filter is corresponding to the low-pass analysis filter.

In this embodiment, in order to realize the DWT and the corresponding IDWT processes using multiple pair of filters, wherein the DWT further comprises: passing the feature sequences through multiple analysis filters to generate multiple analyzed component data, respectively; and down-sampling the multiple analyzed component data to generate at least two of the plurality of component data, and wherein the IDWT further comprises: up-sampling the updated data to generate up-sampling updated data; and passing the up-sampling updated data through multiple synthesis filters to obtain the reconstructed speech data, wherein each of the synthesis filters are corresponding to one of the analysis filters, wherein a factor of the down-sampling equals to a factor of the up-sampling and the number of the plurality of component data.

In this embodiment, in order to extract feature sequences, the extracting comprises performing one of the following algorithm to generate the multiple feature sequences: power-normalized cepstral coefficients (PNCC) algorithm; filter-bank (FBANK) algorithm; and Mel-frequency cepstral coefficients (MFCCs) algorithm.

In this embodiment, in order to utilize limited transmission bandwidth between the first device and the second device, wherein the first processor is further configured for compressing element-wisely the at least one of the plurality of component data before the transmitting, wherein the second processor is further configured for correspondingly uncompressing element-wisely the received data before the updating, and wherein the compressing and uncompressing techniques comprises one of the following: pulse code modulation (PCM); and codebook-based modulation.

In accordance with an embodiment of client side computing, the present application provides a method, comprising: recording speech and outputting frames of recorded signal by an acoustic transducer module; extracting multiple-dimensional speech features from the frames of the recorded signal to generate multiple feature sequences; applying discrete wavelet transform (DWT) to the feature sequences to obtain a plurality of component data; and transmitting at least one of the plurality of component data via a network to a receiving computer by a first network module, wherein another one of the plurality of component data is not transmitted.

In this embodiment, in order to save transmission bandwidth between a client side and a server side and process complexity, the plurality of component data comprises low-frequency modulation component (LFC) data and high-frequency modulation (HFC) data, wherein the LFC data is transmitted and the HFC data is not transmitted.

In this embodiment, in order to realize the DWT using one filter, wherein the DWT further comprises: passing the feature sequences through a low-pass analysis filter to generate analyzed low-frequency modulation (LFC) data; and down-sampling the analyzed LFC data with a factor of two to generate the at least one of the plurality of component data.

In this embodiment, in order to realize the DWT using multiple filters, wherein the DWT further comprises: passing the feature sequences through multiple analysis filters to generate multiple analyzed component data, respectively;

and down-sampling the multiple analyzed component data to generate at least two of the plurality of component data, wherein a factor of the down-sampling equals to a factor of a corresponding up-sampling and the number of the plurality of component data.

In this embodiment, in order to extract feature sequences, the extracting comprises performing one of the following algorithm to generate the multiple feature sequences: power-normalized cepstral coefficients (PNCC) algorithm; filter-bank (FBANK) algorithm; and Mel-frequency cepstral coefficients (MFCCs) algorithm.

In this embodiment, in order to utilize limited transmission bandwidth between a client side and a server side, the method further comprises compressing element-wisely the at least one of the plurality of component data before the transmitting, wherein the compressing techniques comprises one of the following: pulse code modulation (PCM); and codebook-based modulation.

In this embodiment, in order to recovery transmission errors, the second processor is further configured for detecting and repairing errors on the received data before the updating.

In accordance with an embodiment of server side computing, the present application provides a method, comprising: receiving data by a second network module from a transmitting computer; updating the received data to generate an updated data; and applying inverse discrete wavelet transform (IDWT) to the updated data to obtain reconstructed speech data, wherein the received data comprises at least one of a plurality of component data generated by discrete wavelet transform (DWT) from multiple feature sequences, which are extracted from frames of recorded speech signal, wherein another one of the plurality of component data is not received.

In this embodiment, the method further comprises at least one of the following steps: in order to utilize limited transmission bandwidth, uncompressing element-wisely the received data before the updating, wherein the uncompressing technique comprises one of the following: pulse code modulation (PCM) and codebook-based modulation; in order to recover transmission errors, detecting and repairing errors on the received data before the updating; in order to prevent over-smooth in the reconstructed speech data, applying a post filter to the reconstructed speech data to compensate the component data which is not received from over-smoothing; and in order to recognize words in the recorded signal, further comprises sending the reconstructed speech data to a speech recognizer for speech recognition.

In this embodiment, in order to save transmission bandwidth between a client side and a server side and process complexity, the plurality of component data comprises low-frequency modulation component (LFC) data and high-frequency modulation (HFC) data, wherein the LFC data is transmitted and the HFC data is not transmitted.

In this embodiment, in order to save transmission bandwidth between a client side and a server side, some of the plurality of component data are transmitted and the others of the plurality of component data are not transmitted to the server side.

In this embodiment, in order to realize the IDWT using one filter, wherein the IDWT further comprises: up-sampling the updated data with a factor of two to generate up-sampling updated data; and passing the up-sampling updated data through a low-pass synthesis filter to obtain the reconstructed speech data, wherein the low-pass synthesis filter is corresponding to a low-pass analysis filter.

In this embodiment, in order to realize the IDWT using multiple filters, wherein the IDWT further comprises: up-sampling the updated data to generate up-sampling updated data; and passing the up-sampling updated data through multiple synthesis filters to obtain the reconstructed speech data, wherein each of the synthesis filters are corresponding to one of analysis filters, wherein a factor of the down-sampling equals to a factor of an up-sampling and the number of the plurality of component data.

The above description is only an outline of the technical schemes of the present invention. Preferred embodiments of the present invention are provided below in conjunction with the attached drawings to enable one with ordinary skill in the art to better understand said and other objectives, features and advantages of the present invention and to make the present invention accordingly.

BRIEF DESCRIPTION OF THE DRAWINGS

The present invention can be more fully understood by reading the following detailed description of the preferred embodiments, with reference made to the accompanying drawings, wherein:

FIG. 18 illustrates a flowchart diagram of a method according to an embodiment of the present application.

FIG. 19 illustrates a flowchart diagram of a method according to an embodiment of the present application.

DETAILED DESCRIPTION OF THE PREFERRED EMBODIMENTS

Figure 1:
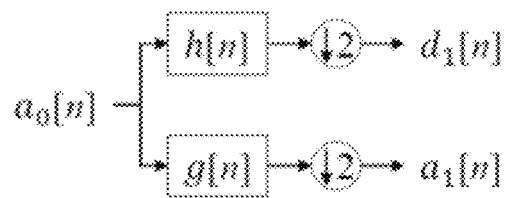
FIG. 1 shows a flowchart diagram of the decomposition process, i.e., one-level DWT, where $\downarrow 2$ represents the factor-2 down-sampling process.

Some embodiments of the present invention are described in details below. However, in addition to the descriptions given below, the present invention can be applicable to other embodiments, and the scope of the present invention is not limited by such, rather by the scope of the claims. Moreover, for better understanding and clarity of the description, some components in the drawings may not necessary be drawn to scale, in which some may be exaggerated relative to others, and irrelevant parts are omitted.

In this application, we propose a novel algorithm applied in DSR to approach the two aforementioned goals, viz. robustness to noise and high data compression. This novel algorithm, named suppression by selecting wavelets with a short-hand notation "SSW", creates the compressed speech feature that contains the low temporal modulation frequency portion. To be more precise, the compression in SSW does not count on a codebook, but is rather in line with the findings in literatures [23], [47]-[49]. [23] reveals that speech components are dominant at temporal modulation frequencies of the signal, which are also referred to as the dynamic envelops of acoustic-frequency subbands. Specifically, it has been shown in [47] that most of the useful linguistic information at in the temporal modulation frequencies between 1 Hz and 16 Hz, with the dominant component at around 4 Hz. Also, according to [48], a bandpass modulation filtering that captures low-frequency spectral and temporal modulations of the acoustic spectrogram for speech signals gives rise to noise-robust speech features, in which the temporal modulations are in the range of 0.5-21 Hz. In [49], the data-driven temporal filters for MFCC feature streams to improve noise robustness are also found to be bandpass and emphasize the component at low temporal modulation frequencies. SSW expands our previous studies [50], [51] that normalize the statistics of subband features on discrete wavelet transform (DWT), and is shown to be suitable for deep neural network (DNN) [52]-[57]. Wavelets are commonly used in signal and image compression to provide high resolution time-frequency analysis [58]-[62], and are favorable for resolving the temporal properties of speech because they use a sliding analysis window function that dilates or contracts when analyzing either the fast transients or slowly varying phenomena [63]. The first step of SSW applies DWT to decompose the full-band input feature stream into low-modulation frequency component (LFC), and high-modulation frequency component (HFC). The second step of SSW discards the HFC information and only preserves the LFC information prior to transmitting across a network to a remote server. The operation of completely discarding HFC expands previous researches [23], [28] on smoothing the inter-frame variations to enhance the robustness of features for back-end recognizers in the server side while performing feature compression simultaneously by only considering LFC to address both issues of a DSR system. As soon as the LFC feature sequence is received on the server side, the third step of SSW normalizes the LFC sequence to alleviate the environmental mismatch between training and testing phases as in [50], [64]. Next, a feature vector with all-zero elements is prepared as the HFC, which works together with the normalized LFC to reconstruct the new feature stream via inverse DWT (IDWT). The reconstructed feature stream is further compensated via a high-pass filter which aims to alleviate possible over-smoothing effects. The resulting features are then used for speech recognition.

The SSW approach will be evaluated for DSR using the standard Aurora-4 robustness task [65], [66] and a Mandarin Chinese broadcast news corpus (MATBN) [67]. The hidden Markov model toolkit (HTK) [68] and the Kaldi speech recognition toolkit (Kaldi) [69] will be used to compare recognition performance for SSW versus the baselines of MFCC, FBANK, QIO, MS, MVN, MVA, TSN and RASTA. The experiments in this application reveal that SSW can accomplish the main goals of DSR: improving performance on the back-end server while also providing up to a 50% compression rate (by discarding the HFC information) during the transmission stage.

The rest of this application is organized as follows: Section II introduces DWT theory and the conventional filtering-based and normalization approaches. Section III covers the steps of the proposed SSW approach. Section IV describes the setups of the DSR system for Aurora-4 and MATBN and discusses the experimental results and justification. Section V concludes.

II. RELATED ALGORITHMS

A. Wavelet Transform

Figure 2:
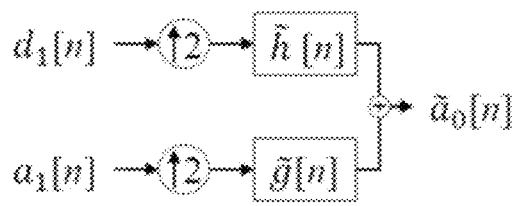
FIG. 2 shows a flowchart diagram of the reconstruction process, i.e., one-level IDWT, where $\uparrow 2$ represents the factor-2 up-sampling process.
Figure 3A:
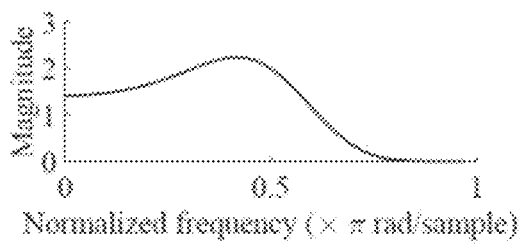
FIG. 3A shows a diagram of frequency response of the biothogonal 3.7 low-pass filter that are applied to DWT.
Figure 3B:
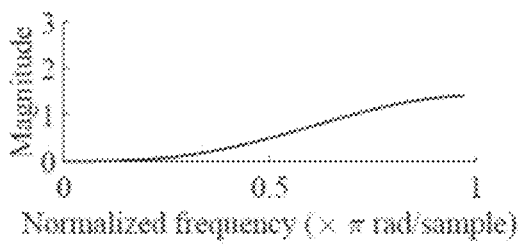
FIG. 3B shows a diagram of frequency response of the biothogonal 3.7 high-pass filter that are applied to DWT.
Figure 3C:
FIG. 3C shows a diagram of frequency response of the biothogonal 3.7 low-pass filter that are applied to IDWT.
Figure 3D:
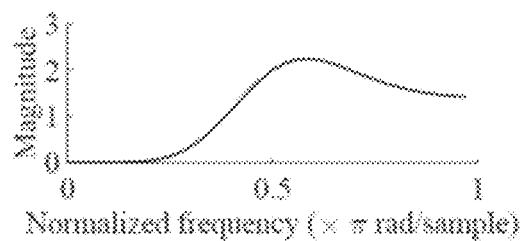
FIG. 3D shows a diagram of frequency response of the biothogonal 3.7 high-pass filter that are applied to IDWT.

FIGS. 1 and 2 show the flowcharts for one-level DWT and IDWT. The signals be decomposed and reconstructed are denoted as $a_0[n]$ and $\tilde{a}_0[n]$. The LFC and HFC containing the low-frequency (approximation) and high-frequency (detail) components of $a_0[n]$ are denoted as $a_1[n]$ and $d_1[n]$. The impulse responses of low-pass and high-pass filter sets for DWT and IDWT are denoted as $\{g[n], \tilde{g}[n]\}$ and $\{h[n], \tilde{h}[n]\}$. Here, the "$\downarrow 2$" and "$\uparrow 2$" symbols represent the factor-2 down-sampling and up-sampling operations.

Stating in more detail, FIG. 1 shows the DWT decomposition process and includes the steps of filtering and down-sampling. First, the signal $a_0[n]$ is filtered by $g[n]$ and $h[n]$, and the resulting outputs are individually passed through the factor-2 down-sampling operation to create $a_1[n]$ and $d_1[n]$. Due to down-sampling, the length of $a_1[n]$ and $d_1[n]$ is approximately half the length of $a_0[n]$. The IDWT reconstruction process is shown in FIG. 2 and includes the steps of up-sampling, filtering, and addition. First, a factor-2 up-sampling process is conducted on $a_1[n]$ and $d_1[n]$. Second, the low- and high-pass filters $\tilde{g}[n]$ and $\tilde{h}[n]$ are separately applied to the up-sampled version of $a_1[n]$ and $d_1[n]$. Finally, the two filtered signals are added to generate the signal a[n]. Notably, a perfect reconstruction can be achieved ($\tilde{a}_0[n] = a_0[n-l]$ with l is a positive integer) by carefully designing filters g[n], h[n], $\tilde{g}[n]$ and $\tilde{h}[n]$ for DWT and IDWT. In addition, the (one-side) bandwidth for each of these filters listed above is approximately $$\frac{\pi}{2},$$

and thus they are half-band filters.

FIG. 3A-D show the frequency response of g[n], h[n], $\tilde{g}[n]$ and $\tilde{h}[n]$ for a commonly used biorthogonal 3.7 wavelet basis, which will be applied in our SSW technique. The biorthogonal X.Y wavelet basis belongs to the biorthogonal wavelets family [70], in which the biorthogonal properties of these filters is defined in Eq. (1), $$\langle \tilde{g}[n], g[n-2l] \rangle = \delta[l],$$
$$\langle \tilde{h}[n], g[n-2l] \rangle = \delta[l],$$
$$\langle \tilde{g}[n], h[n-2l] \rangle = \langle \tilde{h}[n], g[n-2l] \rangle = 0, \quad (1)$$

where the $\delta[l]$ is the Dirac delta function, and $\langle . \rangle$ represents the inner production operation. In addition, the indices, X and Y, represent the order of vanishing moments for the two low-pass filters g[n] and $\tilde{g}[n]$ for DWT and IDWT, respectively [71]. Here, a low-pass filter $\varphi[n]$ ($\varphi[n] \in \{g[n], \tilde{g}[n]\}$) with the frequency response $\Psi(e^{j\omega})$ having a vanishing moment K for satisfies the following condition:

$$\left. \frac{d^k |\Psi(e^{j\omega})|}{d\omega^k} \right|_{\omega=\pi} = 0 \text{ for } k = 0, 1, \ldots, K-1. \quad (2)$$

Therefore, K indicates the rate of decaying to zero at frequency Tr for the frequency response of the filter. Higher-order vanishing moment shows high decaying rate and the sharp boundary of a filter in the frequency domain. More details for vanishing moments can be found in [72] and [73].

From FIG. 3A-D, all of the filters are approximately half-band. In addition, the magnitude response of the low-pass analysis filter g[n], is symmetric to that of the high-pass synthesis filter $\tilde{h}[n]$ about the frequency $\pi/2$ and so do the high-pass analysis filter h[n] and the low-pass synthesis filter $\tilde{g}[n]$. That is $|G(e^{j\omega})| = |H(e^{j-\omega})|$ and $|H(e^{j\omega})| = |\tilde{G}(e^{j\omega})|$, where $G(e^{j\omega})$, $H(e^{j\omega})$, $\tilde{G}(e^{j\omega})$ and $\tilde{H}(e^{j\omega})$ are the Fourier transform of g[n], h[n], $\tilde{g}[n]$ and $\tilde{h}[n]$, respectively. Such a quadratic mirror property is commonly possessed by the wavelet filter sets.

B. Robust Feature Extraction

Figure 4:
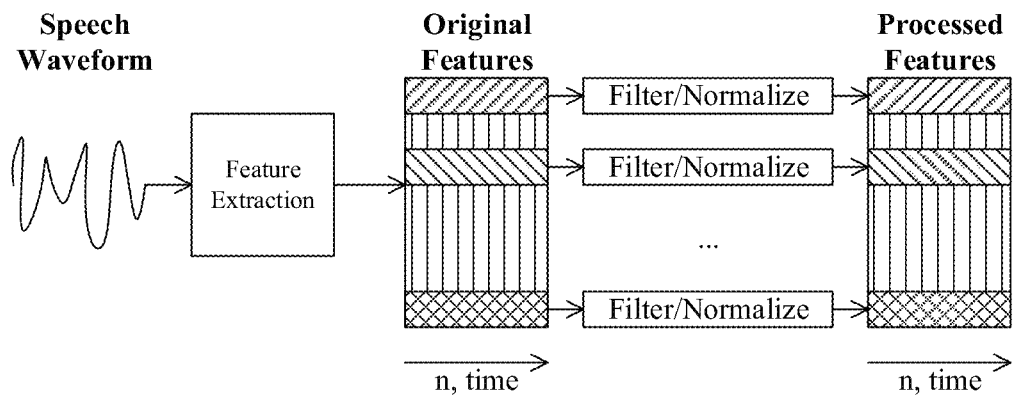
FIG. 4 shows a block diagram of robust feature extraction via filtering/normalization processing.

This section reviews the temporal filtering and statistics normalization algorithms. FIG. 4 illustrates the temporal domain feature extraction for the filtering or statistics normalization. From the figure, the power spectrum of an input speech waveform is first created through the conventional show-time Fourier transform for feature extraction. Next, pre-defined mel-filter banks are carried out to filter the power spectrum and to capture the intra-frame spectral information, and followed by the logarithmic operation to form the FBANK feature. The static MFCC feature is derived as well by further applying discrete cosine transform to FBANK. The delta and delta-delta MFCC features are then extracted and combined with static MFCC to provide final MFCC features of an utterance.

1) Filtering Algorithms:

Most approaches [28], 874] are designed accordingly on the theory that low-modulation frequencies (except the near-DC part) contain the critical aspects of speech. Let $c^i[n]$ denote the original time sequence of an arbitrary feature channel i with n the frame time index. A new sequence $\tilde{c}^i[n]$ obtained from $c^i[n]$ via a filtering process can be described by $$\tilde{c}^i[n] = G_F\{c^i[n]\} = h[n] \otimes c^i[n], \quad (3)$$

where h[n] is the impulse response of the applied filter. The associated system function is further denoted as H(z). The temporal filter structures of RASTA and MVA integrate a low-pass filter and a high-pass-like process, which acts like a band-pass filter to alleviate the near-DC distortion and also to suppress the high-frequency components in the modulation domain. RASTA uses a filter with the system function:

$$H_{RASTA}(z) = z^4 \frac{0.2 + 0.1z^{-1} - 0.1z^{-3} - 0.2z^{-4}}{1 - 0.98z^{-1}}, \quad (4)$$

MVA normalize the incoming time series to be zero-mean and unity-variance, prior to passing through an ARMA filter:

$$H_{ARMA}(z) = \frac{1 + z^{-1} + \cdots + z^{-M}}{(2M+1)z^{-M} - z^{-M-1} - \cdots - z^{-2M}}, \quad (5)$$

where M is the order to the filter (M=1 in experiments)

2) Normalization Algorithms:

Most approaches reduce the mismatch between the training and testing conditions by equalizing the specific statistical quantities of an arbitrary temporal feature sequence (in the training and testing sets) to a target value. For instance, MS processes the first-order statistical moments, MVN processes the first- and the second-order statistical moments, and HEQ normalizes the entire probability density function (PDF), which amounts to all-order statistical moments. In these approaches, the target statistical quantities are usually obtained from all the utterances of the training set.

III. PROPOSED ALGORITHMS

Figure 5:
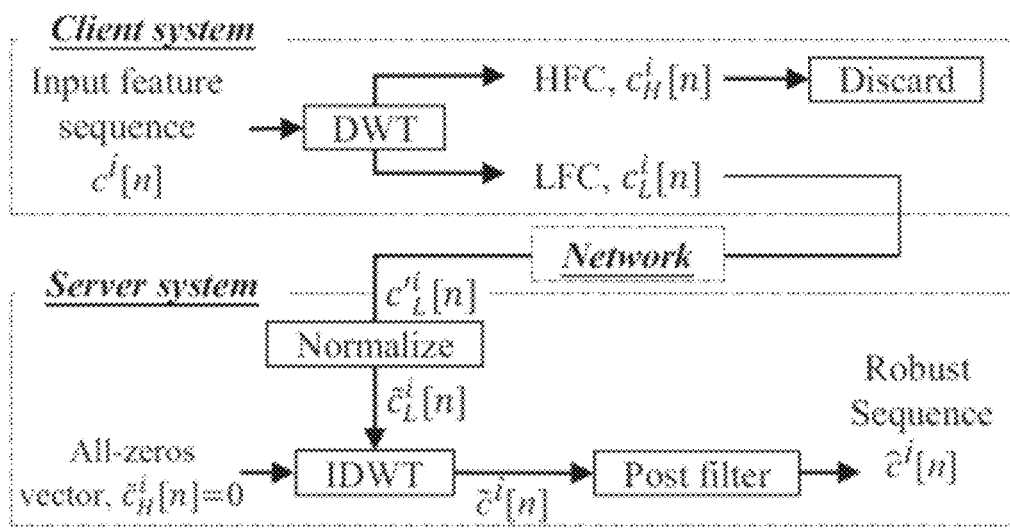
FIG. 5 shows a flowchart diagram of the proposed SSW algorithm.

FIG. 5 shows the flowchart for the proposed SSW algorithm. In DST, SSW is split into the client phase and the server phase. The "Discard" block refers to the step of discarding HFC, the "Normalize" block refers to the statistics normalization, and the "Post filter" block refers to high-pass filter as in Eq. (12). A vector with all-zeros serves as the HFC on the server end. Thus the transmitted stream is one half the length of the original stream.

A. Client System

An I-dimensional speech feature $\{c^i[n]; i=0, 1, \ldots, I-1\}$ (such as MFCC, FBANK, or PNCC) is first extracted from each frame of the recorded signal on the client device, where n is the frame index. A one-level DWT is further applied to the feature sequence $c^i[n]$ with respect to any arbitrary channel i to obtain the LFC $c_L^i[n]$ and HFC $c_H^i[n]$, which carry the distinctive temporal properties of the original sequence $c^i[n]$. This DWT decomposition is formulated by:

$$\{c_L^i[n], c_H^i[n]\} = G_{DWT}\{c^i[n]\}, \quad (6)$$

where $G_{DWT}\{.\}$ denotes the one-level DWT operation. If the Nyquist frequency of the input $c^i[n]$ is F Hz, then the frequency ranges of $c_L^i[n]$ and $c_H^i[n]$ are roughly [0, F/2] Hz and [F/2, F] Hz. For example, the value of F equals 50 for the commonly used frame rate of 100 Hz.

The LFC $c_L^i[n]$ and HFC $c_H^i[n]$ will be handled differently: (1) LFC $c_L^i[n]$ is directly transmitted to the server end (which decreases the length of the original stream $c^i[n]$ in half), (2) HFC $c_H^i[n]$ is completely discarded. These operations are primarily based on the theory that relatively low temporal modulation-frequency components (roughly between 1 Hz and 16 Hz) contain most of the useful linguistic information, and that temporal filters should de-emphasize the high-modulation frequency portions of speech to reduce the noise effect [28], [47]-[49], [75]. Therefore, it is expected that discarding HFC $c_H^i[n]$ in $c^i[n]$ will not degrade the performance.

According to the preceding discussion, only the LFC of the input $c^i[n]$ is concerned for the subsequent process while its HFC is totally discarded. Therefore, in practical implementations, we can simply pass $c^i[n]$ through the low-pass analysis g[n] of DWT, and then proceed with the factor-2 down-sampling, which is depicted in the upper part of FIG. 5 and can be expressed by $$c_L^i[n] = \Sigma_l g[l] c^i[2n-1]. \quad (7)$$

In other words, the high-pass branch of the one-level DWT can be completely omitted here since it has nothing to do with the signal $c_L^i[n]$, which is to be transmitted to the server end.

B. Server System

In the bottom row of FIG. 5, we assume that the network channel is error-free (with no quantization error, channel distortion and packet loss) and thus the received $c'_L^i[n] = c_L^i[n]$. $c'_L^i$ is first updated via a statistics normalization algorithm, such as MS or MVN, so that the resulting normalized LFC $\tilde{c}_L^i[n]$ will be more robust than the original LFC $c_L^i[n]$. Then, SSW uses a zero sequence as the new HFC to be used in the following IDWT process:

$$\tilde{c}_H^i[n] \equiv 0, \text{for all } n, \quad (8)$$

where $\tilde{c}_H^i[n]$ has the same size of $\tilde{c}_L^i[n]$. Afterward, IDWT is applied to merge the two half-band components, $\tilde{c}_L^i[n]$ and $\tilde{c}_H^i[n]$, thereby reconstructing a full-band feature sequence as:

$$\tilde{c}^i[n] = G_{IDWT}\{\tilde{c}_L^i[n], \tilde{c}_H^i[n]\}, \quad (9)$$

where $G_{IDWT}\{.\}$ denotes the one-level IDWT operation. It should be noted that IDWT reconstructed sequence $\tilde{c}^i[n]$ differs from the original sequence $c^i[n]$ in Eq. (6), as $\tilde{c}^i[n]$ is expected to vary more smoothly in time than $c^i[n]$ since the HFC of $\tilde{c}^i[n]$ has been zeroed out, as in Eq. (8).

Analogous to the previous discussions, in practical implementations $\tilde{c}^i[n]$ can be obtained by directly passed the normalized LFC, $\tilde{c}_L^i[n]$, through the factor-2 up-sampling and the low-pass synthesis filter $\tilde{g}[n]$, depicted in the lower part of FIG. 5 and expressed by $$\tilde{c}_{L,up}^i[n] = \begin{cases} \tilde{c}_L^i\left[\frac{n}{2}\right], & \text{if } n = 0, 2, 4, \ldots, \\ 0, & \text{otherwise,} \end{cases} \text{ and} \quad (10)$$

$$\tilde{c}^i = \sum_l \tilde{g}[l] \tilde{c}_{L,up}^i[n-l]. \quad (11)$$

That is, only the low-pass branch of the IDWT process is put into effect actually.

In practice, the IDWT output $\tilde{c}^i[n]$ was found to be over-smoothed, so a post filter is applied to $\tilde{c}^i[n]$ to compensate its high-frequency components:

$$\hat{c}^i[n] = \tilde{c}^i[n] - \frac{\alpha}{2}\tilde{c}^i[n-1], \quad (12)$$

where α is non-negative constant. As a result, $\hat{c}^i[n]$ in Eq. 12 serves as the final output of the SSW algorithm. Please note that setting α=0.0 causes no filtering on $\tilde{c}^i[n]$, while a positive a amounts to a high-pass filter performed on $\tilde{c}^i[n]$.

C. Analysis

Some discussions about the presented SSW method are as follows:

1) Qualitative analysis: When ignoring the client-server transmission error and the effect of normalization in the SSW process shown in FIG. 5, the relationship between the two spectra $C^i(e^{j\omega})$ and $\tilde{C}^i(e^{j\omega})$ of the input $c^i[n]$ and the output $\tilde{c}^i[n]$ (before the final high-pass post-filtering), respectively, can be expressed by $$\tilde{C}^i(e^{j\omega}) = 0.5 C^i(e^{j\omega}) G(e^{j\omega}) \tilde{G}(e^{j\omega}) + 0.5 C^i(e^{j(\pi-\omega)}) G(e^{\pi-\omega}) \tilde{G}(e^{j\omega}), \quad (13)$$

where $G^i(e^{j\omega})$ and $\tilde{G}^i(e^{j\omega})$ are the frequency response of the two low-pass filters, g[n] and $\tilde{g}[n]$. Please note that on the right-hand side of Eq. (13), the term $C^i(e^{j(\pi-\omega)})G(e^{\pi-\omega})$ is the mirror image of $C^i(e^{j\omega})G(e^{j\omega})$ with respect to the center frequency ω=π/2 caused by the factor-2 up-sampling. In addition, the high-frequency mirror spectrum $C^i(e^{j(\pi-\omega)})G(e^{\pi-\omega})$ can be nearly removed by the subsequent low-pass thesis filter $\tilde{G}(e^{j\omega})$, and thus $$\tilde{C}^i(e^{j\omega}) \approx 0.5 C^i(e^{j\omega}) G(e^{j\omega}) \tilde{G}(e^{j\omega}), \quad (14)$$

given that the anti-aliasing filter $G(e^{j\omega})$ and anti-image filter $\tilde{G}(e^{j\omega})$ have been well designed.

Figure 6:
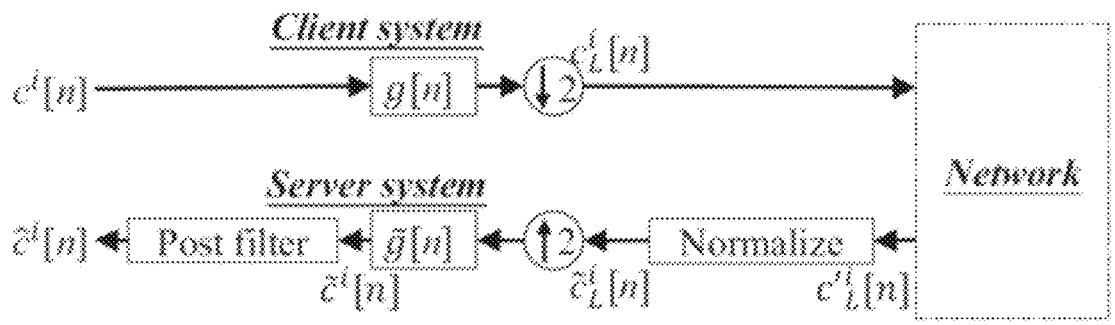
FIG. 6 shows a block diagram of the real operation system of the SSW approach.

According to the flowchart of real-operation system of the SSW approach shown in FIG. 6, the filter being used include g[n] and $\tilde{g}[n]$ only, and in fact these two-pass filters are not necessarily required to be wavelet bases for DWT and IDWT. However, here we adopt the wavelet filters primarily for two reasons: First, DWT/IDWT have been widely applied as an octave-band analysis/synthesis filter bank with down-sampling/up-sampling that can achieve perfect reconstruction of signals. Given that the temporal series of the clean speech feature $c^i[n]$ has a nearly negligible higher half-band processing $c^i[n]$ with merely the low-frequency branch in the concatenation of DWT and IDWT can result in a good approximation of $c^i[n]$. Second, the low-pass filters in some particular wavelets families, such as the biorthogonal wavelets stated in sub-section II-A, are designed to have a symmetric impulse response and are thus linear-phase, indicating that they will not introduce phase distortion to the input series $c^i[n]$.

Figure 7:
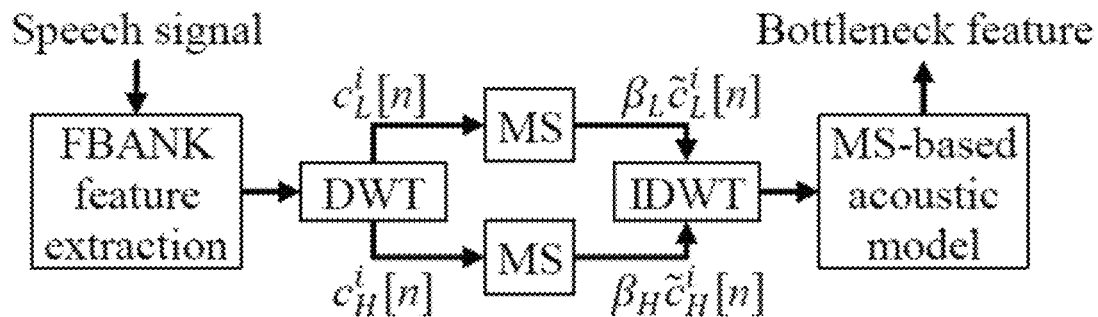
FIG. 7 shows a flowchart diagram of the analysis system, which is designed to confirm the effectiveness of SSW, where LFC and HFC are dominated by speech-relevant and speech-irrelevant components, respectively.

2) Quantitative analysis: At the outset, we conducted a preliminary evaluation to demonstrate that the speech-dominant component for recognition can be captured by SSW. One clean utterance with the transcript "Acer international corporation of Taiwan shows a machine billed as compatible with the bottom hyphen the hyphen line p.s. slash two model thirty period." was selected from the Aurora-4 database [66] and then artificially contaminated by any of three additive noises (car, street and train-station) at three signal-to-noise ratios (SNR) levels (5 dB, 10 dB and 15 dB). The resulting ten utterances (one clean and nine noisy utterances) were passed through the system shown in FIG. 7. From this figure, each of the utterances was converted to FBANK feature streams, passed through a one-level DWT to obtain the LFC and the HFC sub-streams, and normalized by mean subtraction (MS). The obtained LFC and HFC sub-streams were further scaled by the binary weighting factors $\{\beta_L, \beta_H | \beta_L, \beta_H \in \{0, 1\}\}$ and then fed into the IDWT to reconstruct the FBANK features. For simplicity, the ultimate FBANK features of all channels are denoted by $\tilde{C}_{\beta_L \beta_H}$ in which the subscript "$\beta_L \beta_H$" was from the aforementioned binary weighting factors indicating the FBANK features contain either of both of LFC and HFC. Thus $\tilde{C}_{11}$ is the original (MS-processed) FBANK consisting of both LFC and HFC, and $\tilde{C}_{10}$ and $\tilde{C}_{01}$ refer to LFC and HFC, respectively. In addition, the three FBANK features, $\tilde{C}_{11}$, $\tilde{C}_{10}$ and $\tilde{C}_{01}$ were fed into CD-DNN-HMM acoustic models (detailed descriptions were given in Section IV-A) to produce the corresponding 2030 dimensional bottleneck features, denoted by $\tilde{M}_{11}$, $\tilde{M}_{10}$ and $\tilde{M}_{01}$. Notably here the bottleneck features were the outputs of the used CD-DNN-HMM without applying the final softmax function. We believe that the result of bottleneck features more directly indicate the classification properties given specific input feature types.

For each feature type ($\tilde{C}_{11}$, $\tilde{C}_{10}$, $\tilde{C}_{01}$, $\tilde{M}_{11}$, $\tilde{M}_{10}$ and $\tilde{M}_{01}$), the frames of features in the aforementioned ten sentences labelled as the three phone units, "s", "sh" and "I", were collected and the processed by principal component analysis (PCA) for dimension reduction. The resulting two-dimensional coefficients of the first two PCA axes for each feature type were depicted in FIG. 8A-F. From the figure, we observe that:

The PCA coefficients for those features with respect to the original FBANK and LFC, viz. $\tilde{C}_{11}$, $\tilde{C}_{10}$, $\tilde{M}_{11}$ and $\tilde{M}_{10}$, reveal clear separations among three different phones, as shown in FIGS. 8(a)(b)(d)(e). This somewhat implies that both the FBANK and LFC serve as good features for phone classification at both clean and noisy conditions. Also, the partial overlap between the clusters of "s" and "sh" is probably owing to the similar physical articulation of these two phones. In addition, the PCA coefficients for $\tilde{C}_{11}$ and $\tilde{C}_{10}$ are quite close, and so are those for $\tilde{M}_{11}$ and $\tilde{M}_{10}$, indicating the LFC is highly dominant at FBANK while the remaining HFC is rather insignificantly in amount.

Figure 8C:
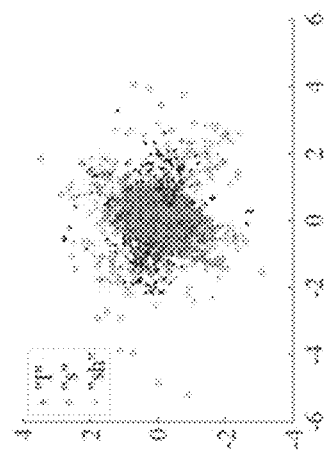
FIG. 8A-F show scatter plots of PCA-processed coefficients $\tilde{C}_{11}$, $\tilde{C}_{10}$, $\tilde{C}_{01}$, $\tilde{M}_{11}$, $\tilde{M}_{10}$ and $\tilde{M}_{01}$ with respect to "l" (blue dot points), "s" (red circle marks) and "sh" (green cross marks) on clean and nine different noisy conditions, respectively.
Figure 8B:
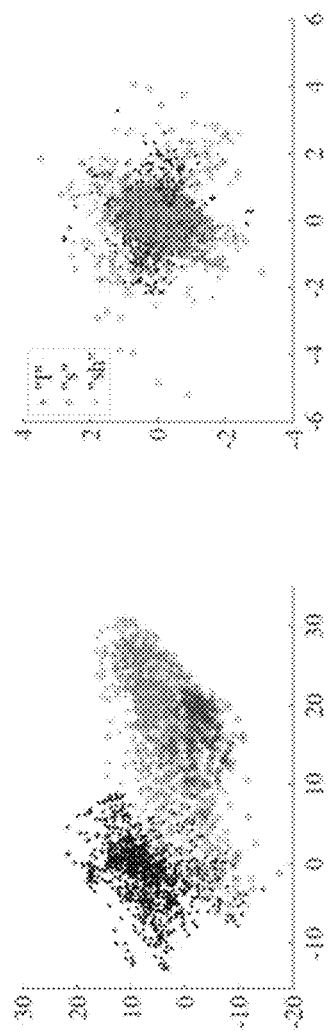
Figure 8A:
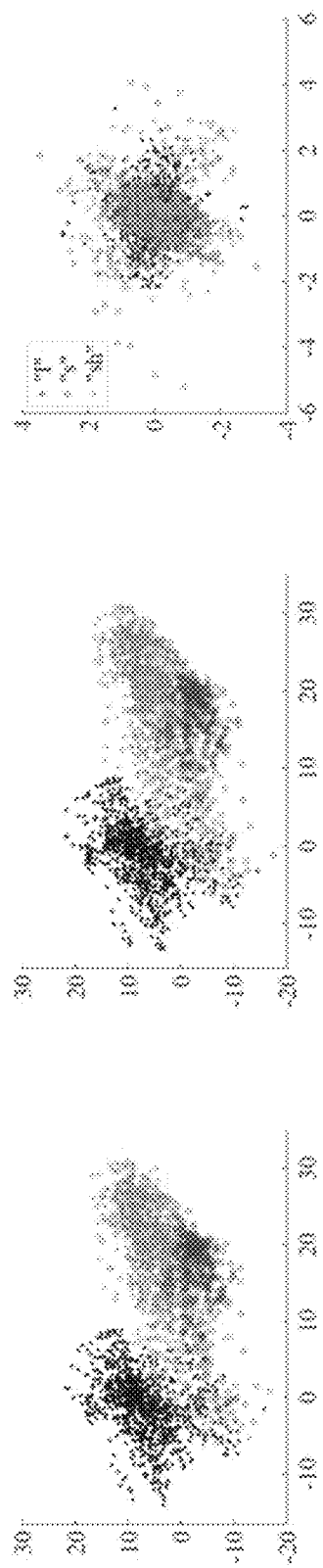
Figure 8F:
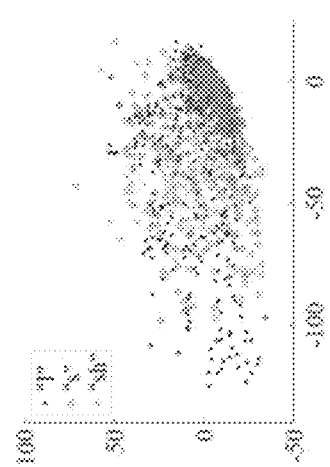
Figure 8E:
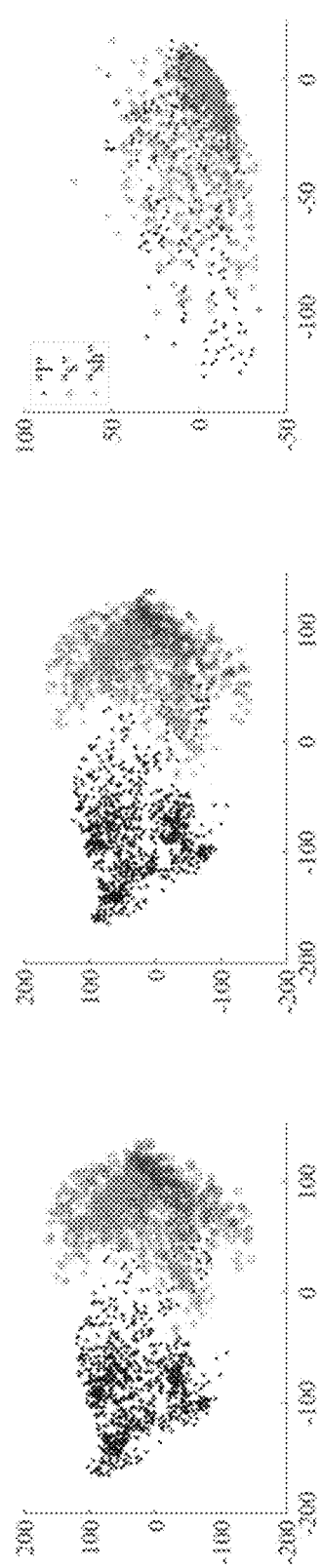
Figure 8D:
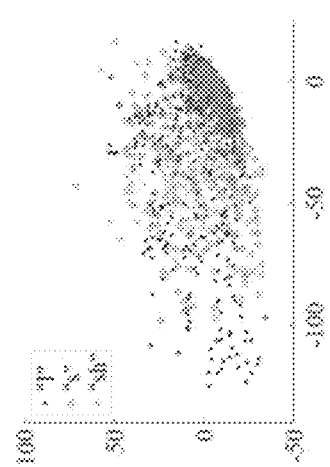

Unlike the cases of FBANK and LFC, the three phone clusters for two HFC-related features ($\tilde{C}_{01}$ and $\tilde{M}_{01}$) significantly overlap with each other, as revealed in FIGS. 8(c)(f). Therefore, the HFC features are shown to contain little discriminating information for classifying the three phones, or they are seriously distorted by noises.

Accordingly, the LFC captured by SSW is believed to preserve the prevailing elements in FBANK for robust speech recognition, while omitting HFC in FBANK just eliminates the irrelevant information and forms a more compact feature.

Figure 9C:
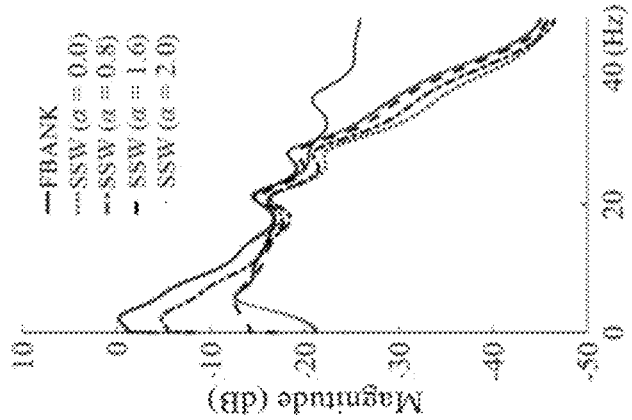
FIG. 9A-C show PSDs of the first (i=0), $20^{th}$ (i=19) and $39^{th}$ (i=38) dimensional FBANK-feature streams are derived on one clean utterance, which is selected from the training set of Aurora-4. In addition, the original speech feature is also processed by SSW with α=0.08, 1.6 and 2.0, respectively.
Figure 9B:
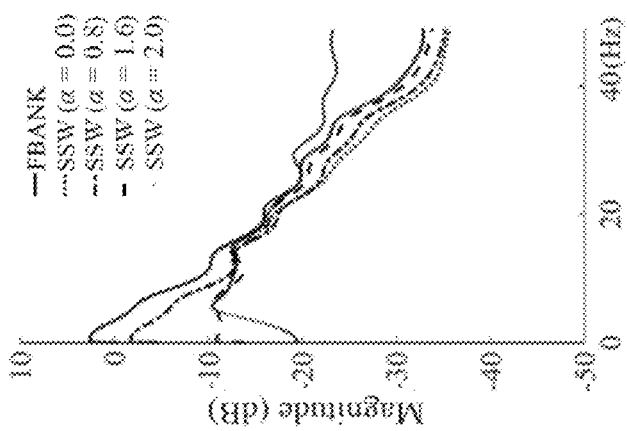
Figure 9A:
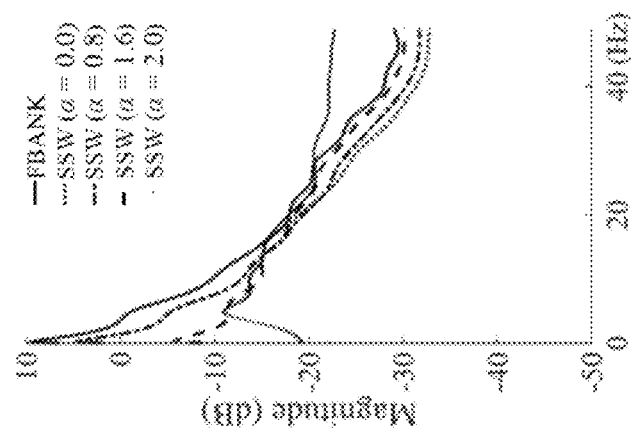

Next, to reveal the effect of the post filter shown in FIG. 6, we conduct SSW (with MS as the statistics normalization algorithm) on the FBANK features of a clean utterance in the Aurora-4 database [66]. Four assignments of the parameter a for the filter as in Eq. (12) are used in SSW, and the power spectral density (PSD) curves of three FBANK features are shown in FIG. 9. From this figure, we first find that SSW causes a significant PSD reduction of FBANK features at the high frequency portion (within around the range [30 Hz, 50 Hz]). In addition, a larger value of a used in the post filter of SSW can further emphasize the speech-dominant band (roughly between 10 Hz and 25 Hz) relative to the highly suppressed low frequency portion (below 4 Hz). These observations indicate that SSW with $\alpha$>0 can suppress the unwanted noise component of an utterance at high modulation frequencies as well as enhance the respective speech component.

IV. EXPERIMENT RESULTS AND ANALYSES

This section presents the experimental setups, demonstrates the evaluation of the SSW algorithm, and discusses the results.

A. Experimental Setup

In the evaluation experiments, the biorthogonal 3.7 wavelet basis set [70] was selected in the DWT/IDWT process of SSW, which frequency responses were shown in FIG. 3A-D. Two databases, Aurora-4 and MATBN were used for the evaluation, which details are described as follows.

Aurora-4 is a medium vocabulary task [66] acquired from the Wall Street Journal (WSJ) corpus [76] at 8 kHz and 16 kHz sampling rate. 7138 noise-free training utterances were recorded with a primary microphone and were further contaminated to form the multi-training set with or without the secondary channel distortions and any of six different types of additive noise (car, babble, restaurant, street, airport, or station) at 10 to 20 dB SNR. The testing data for clean and noisy scenarios contained 14 different test sets (Sets 1-14) with each set containing 330 utterances. A single microphone was used to record Sets 1-7, and different microphones, with distorted utterances with channel noises, were used to record Sets 8-14. Next, Sets 2-7 and Sets 9-14 were further contaminated by the six types of additive noises at SNR levels from 5 to 15 dB. All 14 testing sets were further organized to four testing subsets, A, B, C and D on the order of clean (Set 1), noisy (Sets 2-7), clean with channel distortion (Set 8), and noisy with channel distortion (Sets 9-14), respectively. In addition, 330 different utterances were recorded for each testing environment to form the development data.

For Aurora-4, two DSR systems were implemented, one based on HTK [68] and the other based on Kaldi [69]. In addition to 39-dimensional MFCCs (including 13 static components plus their first- and second-order time derivatives), and 40-dimensional FBANK features, we implemented 45-dimensional QIO as comparative features that were designed to perform data compression for client-server systems [18]. For the HTK systems, the training and testing data at 8 kHz sampling rate were used to simulate a more challenging condition. 166 utterances for each test set were selected and used to test recognition as suggested in [66]. The multi-condition training data were used to train the context dependent (CD) triphone acoustic models, where each triphone was characterized by a hidden Markov model (HMM) with 3 states and 8 Gaussian mixtures per state and 16 mixtures per state was applied to the silence. For the Kaldi system, the training and testing data at 16 kHz sampling rate were used to test performance. All 330 utterances for each test set were applied to test system performances [66]. The clean-condition training data were used to train CD Gaussian mixture model HMM (CD-GMM-HMM) based on the maximum likelihood (ML) estimation criterion. With the fixed CD-GMM-HMM, the extracted QUI- or FBANK-based robust features were applied to train CD-DNN-HMM model. Seven layers were used for the DNN structure. The same structure was used in several previous studies that test recognition performance on Aurora-4 [77], [78]. Among these layers, there were five hidden layers with each layer containing 2048 nodes. The input layer for the DNN had (440*(5*2+1)) dimensions for 5 left/right context frames, and the output layers had 2030 nodes. A set of tri-gram language models was created based on the reference transcription of training utterances. Evaluation results are reported using word error rate (WER).

MATBN is a 198-hour Mandarin Chinese broadcast news corpus [67], [79], recoded from Public Television Service Foundation of Taiwan that contains material from a news anchor, several field reporters and interviewees. The material was artificially segmented into utterances, and contained background noise, background speech, and background music. A 25-hour gender-balanced subset of the speech utterances was used to train the acoustic models. A 3-hour data subset was used as the development set (1.5 hours) and the testing set (1.5 hours). MATBN was originally recorded at a 44.1 kHz sampling rate, and further down-sampled to 16 kHz.

For MATBN, a DSR system was implemented on the Kaldi [69] toolbox with three types of speech features: 39-dimensional MFCCs (including 13 static components plus their first- and second-order time derivatives), 40-dimensional FBANK, and 45-dimensional QUI features. MFCCs with MVN extracted from the training data were selected for training CD-GMM-HMM. With the fixed CD-GMM-HMM, the extracted QIO- or FABNK-based robust features were applied to train CD-DNN-HMM model. DNN structures contained eight layers, with six hidden layers and 2048 nodes per layer. This model structure gave the best performance tested on the development set. The input layer for DNN-HMM had (440*(5*2+1)) dimensions for 5 left/right context frames, and the output layer had 2596 nodes. Evaluation results are reported as the average character error rates (CER).

B. Experimental Results

The results of the Aurora-4 (English) and MATBN (Mandarin) tasks are presented in three perspectives: (1) data compression, (2) recognition results, and (3) qualitative analysis.

1) Data Compression:

Tables I and II show the volumes of the original and SSW (LFC of FBANK) features for the training data (stored on the server end), and for the testing data (transmitted from the client end). The compression ratio is calculated between the volumes of original features ($V_O$) and the SSW features ($V_S$), as defined in Eq. (15). Tables I and II show SSW immediately reducing the stored and transmitted data volume by approximately 50%, which is a result of the factor-2 down-sampling operation of DWT (as well as the discarding operation of the HFC from the original feature sequence). Although these data compression results are significantly large in size, it will be important to determine if these compressed SSW features can actually maintain or even improve the recognition accuracy in DSR applications.

$$\text{Ratio} = 1 - \frac{V_S}{V_O} \quad (15)$$

TABLE I

THE VOLUME (UNIT: MAGA BYTES, MB) OF FBANK AND SSW (ON PROCESSED-FBANK) FEATURES REQUIRED IN THE SERVER SYSTEMS FOR THE TRAINING DATA IN AURORA-4 AND MATBN, AND THE AVERAGED COMPRESSION RATIO OF EACH UTTERANCE (DENOTED AS "AVG.").

| Database | Volume for FBANK | Volume for SSW | Avg. |
|---|---|---|---|
| Aurora-4 | 414.89 MB | 211.37 MB | 48.87% |
| MATBN | 685.90 MB | 361.85 MB | 46.72% |

TABLE II

THE VOLUME (UNIT: MAGA BYTES, MB) OF FBANK AND SSW (ON PROCESSED-FBANK) FEATURES REQUIRED DURING TRANSMISSION BY THE CLIENT TO THE SERVER SYSTEMS FOR THE TESTING DATA IN AURORA-4 AND MATBN, AND THE AVERAGED COMPRESSION RATIO OF EACH UTTERANCE (DENOTED AS "AVG.").

| Database | Volume of FBANK | Volume of SSW | Avg. |
|---|---|---|---|
| Aurora-4 | 257.55 MB | 131.32 MB | 48.88% |
| MATBN | 12.12 MB | 6.34 MB | 47.26% |

2) Recognition Results:

We first conducted experiments to investigate the correlation of the parameter a in SSW with the recognition accuracy. Table III shows the recognition results in terms of WER of the Kaldi-based DST tested on the development subsets of Aurora-4, where this subset was formed by selecting 330 utterances from all of the 14 development sets. The MS result is also reported in Table III for comparison. From the table, lower WERs as compared to MS are noted when a values are larger than 0.8. In addition, when a is 1.6, the SSW yields the lowest WER. Based on the results in Table III, a was set 1.6 to test SSW on Aurora-4 in the Kaldi-based DSR in the following experiments. We also tested recognition using development sets to determine the optimal a in SSW for other DSR systems for both Aurora-4 and MATBN tasks. In the following discussions, we reported the SSW results with the optimal a determined by the development sets.

TABLE III

EXPERIMENTAL RESULTS FOR MS AND SSW WITH RESPECT TO DIFFERENT α VALUES ON THE DEVELOPMENT SUBSET OF AURORA-4 IN KALDI-BASED DSR.

| α | 0.0 | 0.4 | 0.8 | 1.2 | 1.6 | 2.0 | MS |
|---|---|---|---|---|---|---|---|
| WER | 35.05 | 28.02 | 27.18 | 26.83 | 26.41 | 27.11 | 27.80 |

Table IV shows the Aurora-4 results from the HTK-based DSR system for the 14 test sets (Sets 1-14) for MFCC and QIO, as well as MFCCs processed by MS, MVN, MVA, TSN and RASTA. It is clear that MS, MVN and TSN improved the performance by lowering the WERs when compared to QIO and MFCCs. Moreover, it is noted that MVA outperformed MS, MVN, RASTA and TSN by combining normalization and the low-pass ARMA filter. The results of the proposed SSW algorithm were also reported in the last row of Table IV. For this task, the SSW approach selects MVN to normalize the LFC feature streams (as shown in FIG. 5), and sets the parameter a in Eq. (12) to zero. Table IV shows SSQ achieved the lowest average WER, and actually improved the performance on the clean set (Testing Set 1).

TABLE IV

ON THE HTK-BASED DSR SYSTEM, WERS OF MFCC, QIO, AND MFCC PROCESSED BY
FILTERING OR NORMALIZATION APPROACHES ON THE 14 TEST SETS OF THE AURORA-4
TASK. BOLD SCORES DENOTE THE BEST PERFORMANCE. THE AVERAGE PERFORMANCE
IS DENOTED AS AVG.

| Set | 1 | 2 | 3 | 4 | 5 | 6 | 7 | 8 | 9 | 10 | 11 | 12 | 13 | 14 | Avg. |
|---|---|---|---|---|---|---|---|---|---|---|---|---|---|---|---|
| MFCC | 10.83 | 12.04 | 20.04 | 22.91 | 23.94 | 20.04 | 24.97 | 16.57 | 19.37 | 26.85 | 30.57 | 33.66 | 27.70 | 31.86 | 22.95 |
| QIO | 11.20 | 10.98 | 19.19 | 20.74 | 19.96 | 18.12 | 20.81 | 13.92 | 16.35 | 22.14 | 26.11 | 25.97 | 23.68 | 25.27 | 19.60 |
| MS | 13.08 | 11.79 | 17.94 | 22.98 | 22.28 | 19.12 | 22.95 | 14.59 | 15.73 | 24.64 | 27.51 | 29.80 | 22.84 | 27.48 | 20.91 |
| MVN | 11.16 | 10.68 | 16.32 | 20.41 | 18.31 | 15.73 | 19.45 | 13.37 | 16.13 | 22.91 | 26.63 | 25.82 | 23.13 | 24.46 | 18.89 |
| MVA | 11.16 | 10.68 | 15.87 | 20.81 | 19.34 | 16.35 | 19.26 | 12.89 | 14.73 | 21.77 | 26.63 | 25.75 | 22.62 | 25.01 | 18.78 |
| TSN | 8.73 | 9.21 | 13.59 | 16.50 | 13.22 | 12.82 | 16.94 | 17.31 | 18.38 | 31.05 | 30.50 | 32.01 | 27.18 | 32.97 | 20.03 |
| RASTA | 13.74 | 11.57 | 16.65 | 22.80 | 19.04 | 17.02 | 20.15 | 24.60 | 23.46 | 31.58 | 32.26 | 36.10 | 32.36 | 34.70 | 24.00 |
| SSW | 10.64 | 10.42 | 15.86 | 20.55 | 18.60 | 16.02 | 19.15 | 13.00 | 15.06 | 22.17 | 26.26 | 25.23 | 22.65 | 24.42 | 18.57 |

Figure 10:
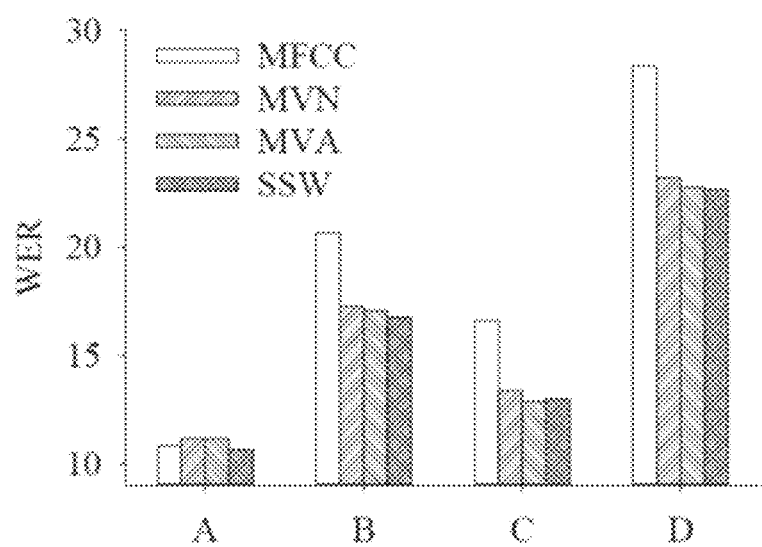
FIG. 10 shows a comparison chart on HTK-based DSR system, performance (WER) for MFCCs, and MFCCs processed by MVN, MVA and SSW on subsets A, B, C and D of Aurora-4.

FIG. 10 shows results of MFCC, MVN, MVA and SSW on four testing subsets A, B, C, and D. From the figure, SSW provided the lowest WERs for subsets A, B, and D, and performed almost as well as MVA for subset C. These results demonstrate the effectiveness of SSW for extracting robust features in HTK-based DSR systems.

Table V shows the Aurora-4 results from the Kaldi-based DSR system for the 14 test sets (Sets 1-14) for FBANK and QIO, as well as FBANKs processed by MS, MVN, MVA, TSN, RASTA, and SSW. For this task, the SSW approach selects MS to normalize the LFC feature streams (as shown in FIG. 5), and sets the parameter a in Eq. (12) to 1.6. Table V shows SSW achieved the lowest average WER, and also improved the performance on the clean test (Testing Set 1). These findings were similar to those observed in the HTK system in Table IV.

Additional experiments were also conducted using MATBN, which is more realistic task since the data contains utterances that are of low-quality and intelligibility (with mispronunciations, repairs, and repetitions) and have real-word noises and background speech (unlike the digitally additive noise of Aurora-4) Table VI shows DNN-HMM results for baseline FBANK and QIO, as well as FBANKs processed by either of MS, MVN, MVA, TSN, RASTA and SSW. The results show SSW outperforms MS, MVA, TSN and RASTA, and providing similar performance to MVN. Since SSW also offers data compression as shown in Table I and Table II, these findings offer conclusive evidence that SSW achieves the main goals of DSR: selecting a representation that is robust while also improving the data transmission efficiency.

TABLE V

ON THE KALDI-BASED DSR SYSTEM, WERS OF FBANK, QIO, AND FBANK PROCESSED BY
FILTERING OR NORMALIZATION APPROACHES ON THE 14 TEST SETS OF THE AURORA-4
TASK. BOLD SCORES DENOTE THE BEST PERFORMANCE. THE AVERAGE PERFORMANCE
IS DENOTED AS AVG.

| Set | 1 | 2 | 3 | 4 | 5 | 6 | 7 | 8 | 9 | 10 | 11 | 12 | 13 | 14 | Avg. |
|---|---|---|---|---|---|---|---|---|---|---|---|---|---|---|---|
| FBANK | 3.08 | 3.87 | 6.37 | 7.68 | 6.93 | 5.94 | 7.79 | 9.04 | 12.20 | 18.96 | 22.70 | 22.44 | 18.14 | 22.06 | 11.94 |
| QIO | 3.87 | 5.34 | 8.99 | 10.80 | 10.89 | 9.10 | 9.71 | 6.16 | 9.47 | 15.47 | 19.20 | 17.11 | 15.56 | 15.67 | 11.24 |
| MS | 2.95 | 3.96 | 6.18 | 7.02 | 6.18 | 5.88 | 6.03 | 6.20 | 8.03 | 17.80 | 17.26 | 17.15 | 16.27 | 18.46 | 9.96 |
| MVN | 3.16 | 4.15 | 6.05 | 7.08 | 6.54 | 5.88 | 7.27 | 6.07 | 8.78 | 16.61 | 18.96 | 17.37 | 16.50 | 16.87 | 10.09 |
| MVA | 3.23 | 4.22 | 5.98 | 7.55 | 7.64 | 6.28 | 7.19 | 6.41 | 9.43 | 18.03 | 20.68 | 18.61 | 16.70 | 17.99 | 10.71 |
| TSN | 3.31 | 4.17 | 5.77 | 7.49 | 6.82 | 5.94 | 6.37 | 5.53 | 7.92 | 17.47 | 19.43 | 17.11 | 16.12 | 16.63 | 10.01 |
| RASTA | 3.83 | 4.35 | 7.27 | 9.06 | 7.15 | 7.44 | 8.01 | 7.70 | 9.77 | 18.51 | 19.73 | 18.08 | 17.69 | 19.93 | 11.32 |
| SSW | 2.93 | 3.61 | 5.27 | 6.58 | 5.92 | 5.10 | 6.54 | 5.94 | 7.92 | 15.97 | 16.53 | 16.31 | 13.67 | 17.34 | 9.26 |

Figure 11:
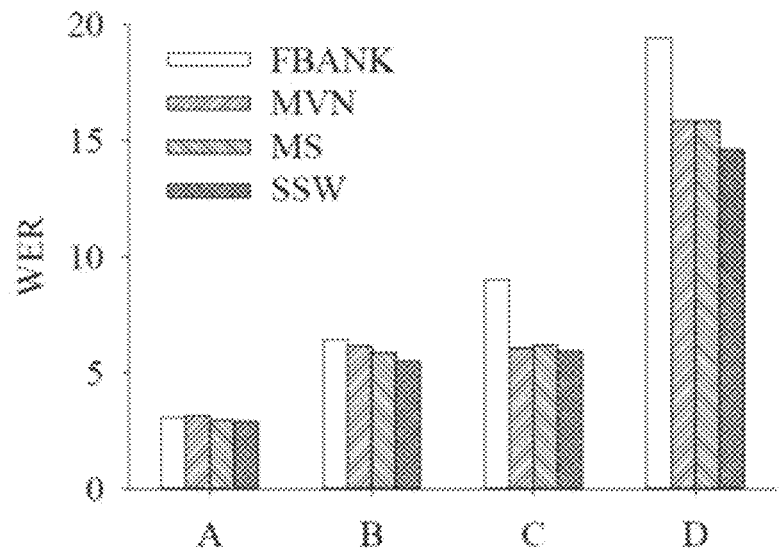
FIG. 11 shows a comparison chart on Kalid-based DSR system, performance (WER) for FBANK and FBANK processed by MVN, MVA and SSW on subsets A, B, C and D of Aurora-4.

FIG. 11 shows results of FBANK, MVN, MS and SSW on four testing subsets A, B, C, and D. From the figure, SSW provided the lowest WERs for subsets B, C and D, and similar performance as MS for subset A. These results demonstrate the effectiveness of SSW feature compression for extracting robust features for Kaldi-based DSR system.

In summary, SSW can handle the issues of additive noise and channel distortions, which were demonstrated in subsets C and D in FIGS. 10 and 11, as well as prove better recognition accuracy for both clean and noisy conditions in Aurora-4 relative to the other approaches. When combined with the ability to provide feature compression as shown in Table I and Table II, these findings offer conclusive evidence that the proposed SSW approach achieves the main goals of DSR: minimizing memory and device requirements while also maintaining or even improving the recognition performance.

TABLE VI

ON THE KALDI-BASED DSR SYSTEM, CERS OF FBANK, QIO,
AND FBANK PROCESSED BY FILTERING OR NORMALIZATION
APPROACHES ON THE MATBN TASK. BOLD SCORES DENOTE
THE BEST PERFORMANCE.

| | FBANK | QIO | MS | MVN | MVA | TSN | RASTA | SSW |
|---|---|---|---|---|---|---|---|---|
| CER | 12.84 | 14.96 | 12.24 | 12.04 | 12.57 | 12.76 | 15.01 | 12.04 |

Figures 12A, 12B, 12C:
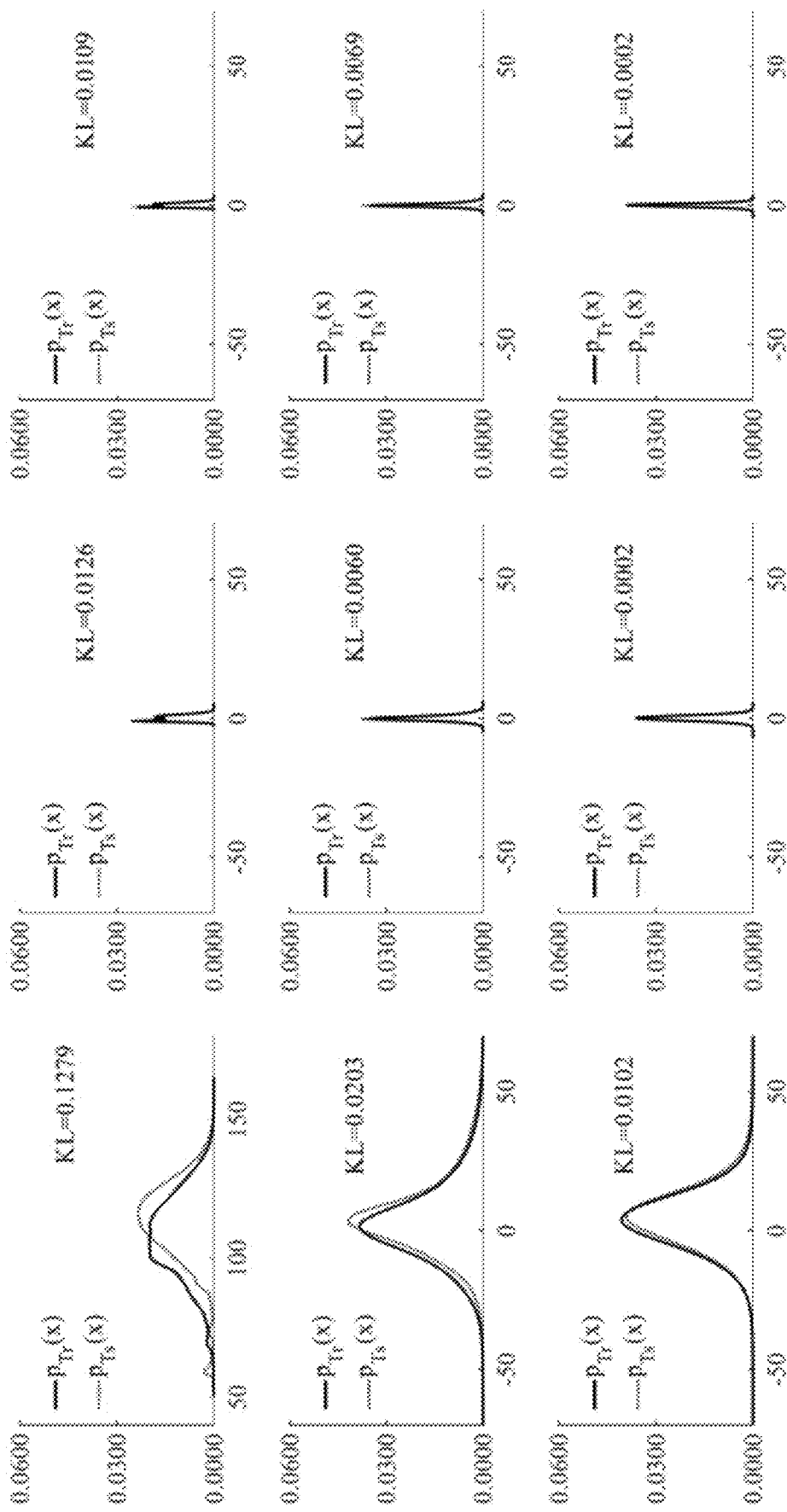
FIG. 12A-C shows histograms and KL divergences from the Aurora-4 training and test sets for MFCC, MFCC processed by MVN and MFCC processed by SSW, respectively. The top, middle and bottom rows indicate the statistical histograms of the first, 4-th and 12-th dimensional feature vectors, respectively.
Figures 13A, 13B, 13C:
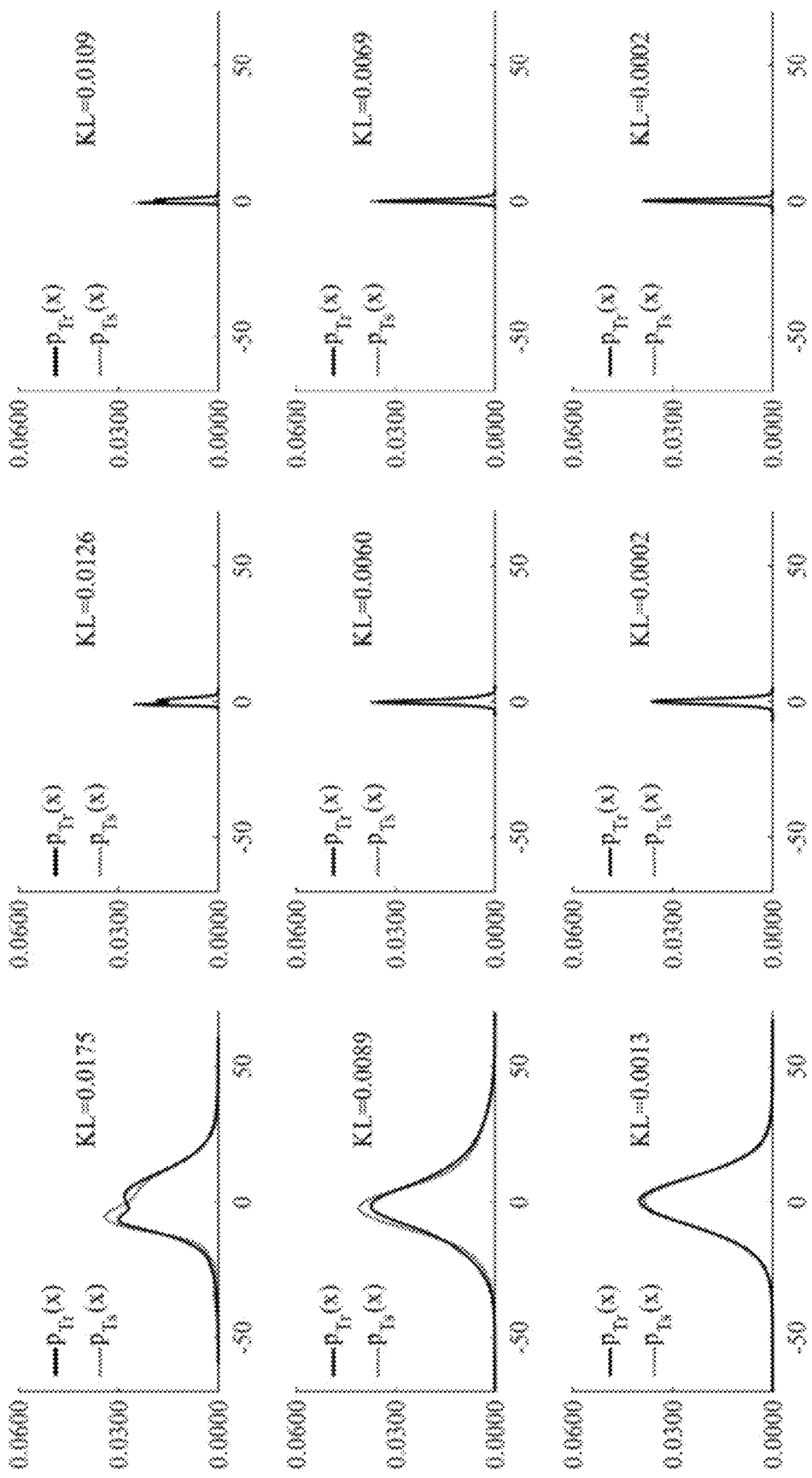
FIG. 13A-C shows histograms and KL divergences from the Aurora-4 training and test sets for FBANK, FBANK processed by MS and FBANK processed by SSW, respectively. The top, middle and bottom rows indicate the statistical histograms of the first, 20-th and 40-th dimensional feature vectors, respectively.
Figures 14A, 14B, 14C:
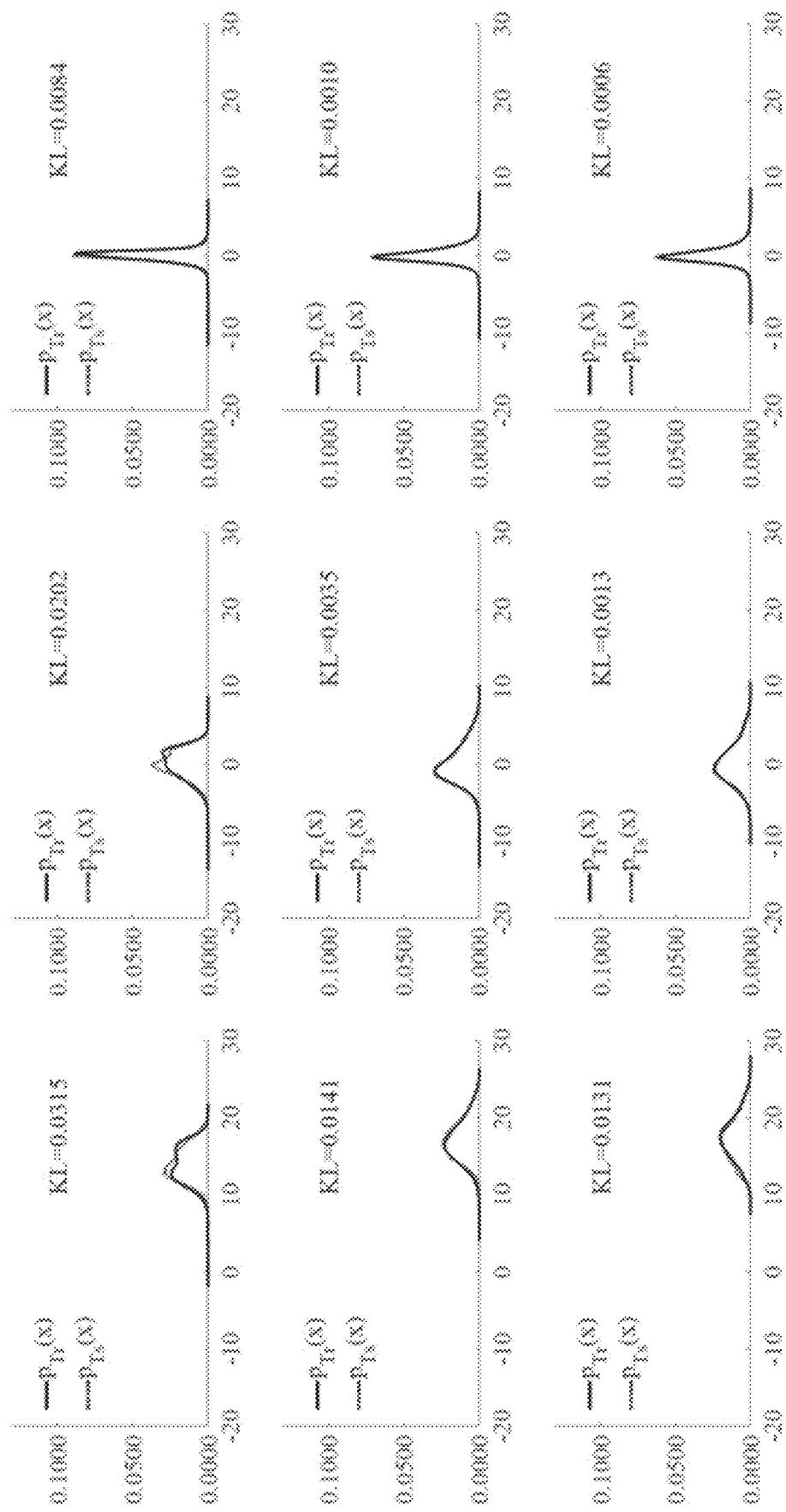
FIG. 14A-C shows histograms and KL divergences from the MATBN training and test sets for FBANK, FBANK processed by MS and FBANK processed by SSW, respectively. The top, middle and bottom rows indicate the statistical histograms of the first, 20-th and 40-th dimensional feature vectors, respectively.

3) Qualitative analysis: In this section, we present the statistical properties of SSW using the histograms from the entire training and test sets. FIGS. 12 and 13 show the histograms on Aurora-4 (MFCC and FBANK), and FIG. 14 shows the feature histograms on MATBN (FBANK). In these figures, the PDF of the training and test sets are denoted as $p_{Tr}$ and $p_{Ts}$. The x-axis and y-axis in all subfigures represent the values and corresponding probabilities of the features. The first, second and third rows of FIG. 12 show the results for the first, $4^{th}$ and $12^{th}$ dimensional features while those rows in FIG. 13 and FIG. 14 are the results for the first, $20^{th}$ and $40^{th}$ dimensional features. For further comparisons, every subfigure also provides the Kullback-Leibler divergence (KL) score between $p_{Tr}$ and $P_{Ts}$ as calculated in Eq. (16):

$$KL = \sum_x p_{Ts} \log \frac{p_{Ts}(x)}{p_{Tr}(x)}, \quad (16)$$

where x is the value in the x-axis. It should be noted that a KL divergence score with a lower value indicates a higher similarity between the two PDFs of $P_{Tr}$ and $P_{Ts}$.

From FIG. 12, we observe that (1) The histograms of the training and testing sets of SSW and MVN matched better when compared to those of MFCC. (2) When compared to MVN, the KL divergence of SSW was notably lower at the first dimension while similar for the other two dimensions. Next, from FIGS. 13 and 14, we observe that (1) The histograms of the training and testing sets of SSW matched better when compared to those of FBANK and MS. (2) The KL divergences of SSW were lower when compared to those of FBANK and MS. The above observations indicate that SSW offered high statistical matching between the training and testing sets by using the integration of the normalization and filtering operations. These findings provide quantitative supports to explain the promising capability of SSW reported in Tables IV, V, and VI.

C. Discussion

In the section, we first provide additional experimental results to further illustrate the advantages of the SSW algorithm. Then, we summarize the novelty and contribution of SSW.

1) Combining SSW with PNCC:

To further demonstrate the effectiveness of SSW, we implemented the PNCC [17] algorithm, which is a state-of-the-art feature extraction method designed based on the consideration of human auditory system to alleviate the effects of additive noise and room reverberation. In this set of experiments, 39-dimensional PNCC (including 13 static components plus their first- and second-order time derivatives) were extracted from the utterance of Aurora-4 and MATBN and further processed by SSW (termed PNCC-SSW) for evaluating on CD-DNN-HMM DSR systems. For Aurora-4, the average WERs of PNCC and PNCC-SSW over 14 test sets were 11.46% and 11.01%, respectively. On the other hand, the CERs of PNCC and PNCC-SSW in MATBN were 13.77% and 13.76%, respectively. Please note that PNCC-SSW reduces the number of feature frames by half when compared to PNCC. These results demonstrate that SSW can perform well to highlight the linguistic information and noise-robust component in the feature, not only MFCC and FBANK (as reported in the previous section), but also PNCC.

2) In Noise Free Environments:

From Tables IV and V, we observe that the SSW can further improve the performance of clean Testing Set 1. To further demonstrate the performance of SSW in noise-free environments, two more experiments were conducted. First, we constructed HTK-based and Kaldi-based DSRs, which used the clean training data at 8 kHz and 16 kHz sampling rates, respectively, in Aurora-4. The training procedure of these two systems was similar to that used in Section IV-A, while the multi-condition training set was not used. For HTK-based DSR, we compared the results of MFCC and SSW, and for Kaldi-based DSR, we compared the results of FBANK and SSW. The clean Testing Set 1 in Aurora-4 was used to recognition. The WERs for MFCC and SSW in the HTK-based systems were 8.91% and 8.40%, respectively, while the WERs for FBANK and SSW in the Kaldi-based system were 3.06% and 2.78%, respectively. The results confirm again that the proposed SSW algorithm can improve the original features by promoting the recognition accuracy, even both training and testing data were recorder in a noise-free condition.

Second, we conducted speech recognition using another test data recorded in a noise-free condition: a subset of WSJ 76] training set containing 1516 clean utterances pronounced by ten speakers were recorded at 16 kHz sampling rate. Those data were selected from the set labeled "si_tr_s", and they had no overlap with the training utterances in Aurora-4. Here, the acoustic models were the ones that used to recognize FBANK and SSW features (as reported in Table V). Please note that these two sets of acoustic models were trained using the multi-condition training set. The recognition results in terms of WERs for FBANK and SSW were 31.59% and 22.99%, respectively. These results again show that SSW can give further improvements even under noise-free environments.

3) Element-Wise Compression and Packet Loss:

As presented in Section IV-B, the SSW algorithm can reduce the amount of data in a feature-frame-wise compression. In a network transmission scenario, quantization techniques such as pulse code modulation (PCM) [80] and SVQ [81]-[83] for element-wise compression are often performed on speech features to conserve the transmission bandwidth. Briefly speaking, the PCM technique quantizes each element in a feature into the pre-defined 2b level and thus reduces the storage requirement for each element to b bits, and SVQ-based approaches first construct a series of codebooks along the feature dimension using the training set, and then use these codebooks to encode the features in the testing set with a small number of bits before transmitting them through the network. Relative to the original data before encoding and transmitting, the received and decoded data on the server side contain distortions including quantization errors as well as losing packets. In the following, we investigate the effect of the combination of SSW (feather-frame-wise compression) and either of the quantization techniques (element-wise compression) on the noisy DSR scenario that suffers from packet loss.

For integrating SSW with PCM, the client side of DSR first extracted LFC features from FBANK and recoded each feature coefficient with 32-bit per sample point. PCM was then applied to quantize each sample point from 32 to 32 (without quantizing), 16, 8, and 4 bits before transmission to the network. On the server side, the quantized LFC features were recovered with each value recorded with 32-bit per sample. Then, the recovered LFC was processed by MS, factor-2 up-sampling and the synthesis filter in sequence as in FIG. 6 to create the final features used for recognition.

We adopted the same systems to test recognition as those used in Tables V and VI, respectively, for Aurora-4 and MATBN tasks. The recognition results on WER and CER for simulated transmission channels were listed in Table VII. From the table, we can observe that the performances of SSW on DSRs maintain satisfactory performance until a performance drop when quantizing a sample point to 4 bits. Please note that for the SSW with 8-bit conditions, the amount of data has been reduced by 8 times during transmission in the network, as opposed to the original FBANK features, while the WERs are actually reduced from 11.94% (Table V) to 9.32% (Table VII) for Aurora-4, and from 12.85% (Table VI) to 11.97% (Table VII) for MATBN. The results indicate that SSW, a frame-wise compression approach, can be combined with PCM, a element-wise compression approach, to further reduce the data transmission requirement.

TABLE VII

RECOGNITION RESULTS OF THE INTEGRATION OF
SSW AND PCM (ELEMENT-WISE COMPRESSION)
FOR AURORA-4 AND MATBN.

| Bits | 32 | 16 | 8 | 4 |
|---|---|---|---|---|
| Aurora-4 | 9.26 | 9.26 | 9.32 | 10.89 |
| MATBN | 12.04 | 12.04 | 11.97 | 12.66 |

Regarding the integration of SSW and SVQ, there are off-line and on-line phases. In the off-line phase, 40-dimensional LFC features $\{c_L^i[n], 0 \leq i \leq 39\}$ extracted from the FBANK of the entire training set were applied to create the codebooks via SVQ [81]-[83]. At first, each of the 40-dim LFC vectors is equally divided into 20 portions, denoted by $c_L^k[n] = [c_L^{2k+1}[n]\ c_L^{2k+1}[n]]^T$, $0 \leq k \leq 19$, and all of the 2-dim sub-vectors of the same portion k in the training set were grouped together to create the corresponding codebook via the Linde-Buzo-Gray (LBG) algorithm [84]. Each codebook consisted of 2b codevectors, where b is the number of bits used to represent each codevector.

In the on-line phase, the 40-dim LFC feature vector corresponding to each frame of testing utterances on the client side was first split into 20 portions as done in the off-line phase. Each sub-vector $c_L^k[n]$ was then encoded in b bits by the corresponding codebook k. As a result, each frame was represented by 20×b bits. Here, the 20-bit data for the individual frame was termed as a packet, which was to be transmitted across the IP network. On the server sides, the received bit streams were then decoded by the aforementioned 20 codebooks to retrieve the LFC $c'_L{}^K[n]$, which were converted to the ultimate feature for recognition by following the procedures depicted in FIG. 6, in which MS was adopted for normalization.

Figure 15:
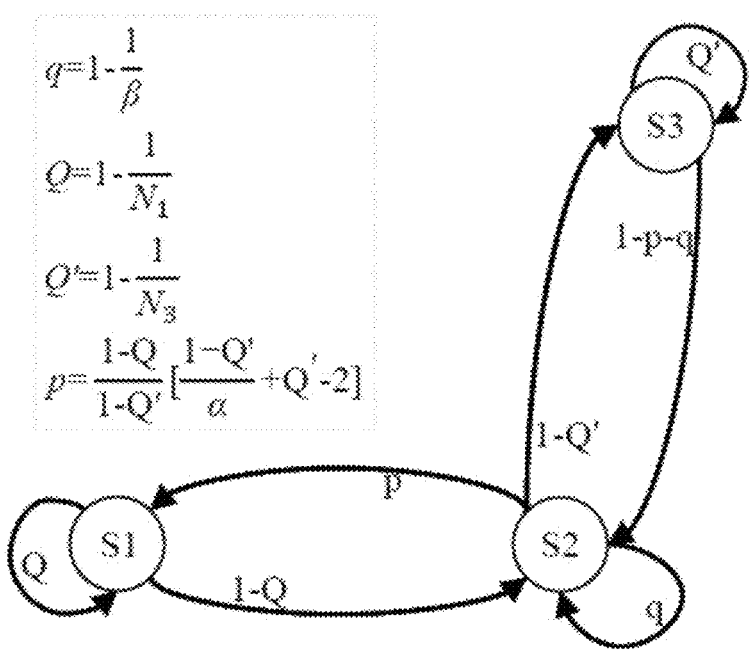
FIG. 15 illustrates a three-state Markov model for simulating burst-like packet loss phenomena [87].

One significant problem in the realistic network transmission is packet loss, which occurs as a result of packet congestion in the network owing to the limited buffer sized at network nodes. Here, we adopted two scenarios to simulate the packet loss situation in the network that transmits the SVQ-coded speech feature between the client and server sides. The first one is rather simple, which assumes that whether a packet is lost or not is independent of the others, and all packet share the same lost rate [85], [86]. The second one is based on a three-state Markov model [86]-[88] as shown in FIG. 15, which incorporates the burst-like phenomenon for a more realistic network environment. In this figure, S1 and S3 are lossless states while S2 is the state that gives packet loss, α is the overall probability of a packet being lost, β is the averaged burst length of packets in S2, and $N_1$ and $N_3$ are the average length of loss-free periods in S1 and S3, respectively. Furthermore, Table VIII provides two channels with different settings for the above the parameters, which was defined in [88] and would be used here for evaluation. On the other hand, in our experiment we assumed that the lost packet could be perfectly detected on the server side, and then an error concealment of insertion-based repair technique [81]. [89], [90] was carried out to replace the lost packet with the nearest successfully received one.

TABLE VIII

PARAMETERS OF THREE-STATE
MARKOV MODEL FOR PACKET LOSS IN FIG. 15.

| Parameters | α | β | $N_1$ | $N_3$ |
|---|---|---|---|---|
| Channel A | 10 | 4 | 37 | 1 |
| Channel B | 10 | 20 | 181 | 1 |

Here, the evaluations were conducted on MATBN with the same recognizer used in the Table VI. Tables IX and X list the recognition results corresponding to different feature types, viz. FBANK, MS, SSW and SSW-SVQ with parameter b (the number of bits for each codevector) being 6, 8, and 10, at either of two packet-loss scenarios described in advance. Besides, results with no packet loss (lost rate=0%) are also listed in Table IX for comparison. Notably, for MS, SSW and SSW-SVQ features, the MS normalization was performed on the client side. From these two tables, we have several findings:

At the case of no packet loss, SSW-SVQ with parameter b=10 behaves the best among all feature types. Reducing the number of bits b does not necessarily provide SSW-SVQ with worse result until b=6. Therefore, integrating SVQ with SSW can further improve the transmission efficiency with insignificant performance degradation.

As for the first packet-loss scenario, the recognition performances for all feature types become worse with the increasing loss rate. MS behaves the best, and SSW-SVQ with parameter b=6, 8, and 10 outperforms SSW alone at the loss rate of 5%, When the loss rate increases to 10%, MS still gives the optimal result while SSW-SVQ becomes the worst.

Regarding the two channels of the second packet-loss scenario, SSW performs slightly worse than MS for channel A while SSW and SSW-SVQ outperform MS and FBANK for channel B. Since both channels have the same packet loss rate while channel B has a larger bursty packet loss (a larger β) than channel A, the results indicate that SSW and SSW-SVQ are more robust than FBANK and MS to deal with the burst-like packet-loss condition during data transmission.

TABLE IX

RECOGNITION RESULTS OF DSR WITHOUT OR
WITH DROPPING PACKETS OF UNIFORM
DISTRIBUTION DURING DATA TRANSMISSION.

| Loss rate | 0% | 5% | 10% |
|---|---|---|---|
| FBANK | 12.84 | 12.97 | 13.17 |
| MS | 12.24 | 12.44 | 12.76 |
| SSW | 12.04 | 13.33 | 13.93 |
| SSW-SVQ(10) | 11.97 | 12.87 | 14.54 |
| SSW-SVQ(8) | 12.01 | 12.90 | 14.43 |
| SSW-SVQ(6) | 12.30 | 13.07 | 14.74 |

TABLE X

RECOGNITION RESULTS OF DSR WITHOUT OR WITH DROPPING PACKETS OF THE THREE-MARKOV-STATE MODEL DURING DATA TRANSMISSION.

| Channel | A | B |
|---|---|---|
| FBANK | 13.72 | 14.15 |
| MS | 13.08 | 13.46 |
| SSW | 13.52 | 12.74 |
| SSW-SVQ(10) | 13.78 | 12.71 |
| SSW-SVQ(8) | 13.67 | 12.99 |
| SSW-SVQ(6) | 13.97 | 13.19 |

4) Complexity Analysis:

We evaluated the complexity of several robust-feature techniques including MS, MVN, MVA, RASTA, and SSW (applying MS to LFC) with the defined complexity factor (CF) [91] in Eq. (17) on Aurora-4 test sets.

$$CF = \frac{T_R}{T_F}, \quad (17)$$

where $T_F$ is the time for extracting FBANKs from all test utterances, and $T_S$ represents the time for processing FBANKs with each of those robustness techniques. From the evaluation, the CF for MS, MVN, MVA, RASTA and SSW are 0.03, 0.12, 0.16, 0.03 and 0.11, respectively. These results show that both SSW and MVA composed with normalization and filter operations are more complex than other techniques. However, SSW with higher compression rate and good recognition performance is suitable for applying for DSR system with slightly high complexity.

5) Contribution and Theory:

From the above experimental results, six major contributions can be noted. (1) The results of the proposed SSW align well with the major findings presented in [23], which has demonstrated that the linguistic information important for speech recognition can be extracted from the dynamics of signal envelopes in frequency sub-bands. (2) The proposed SSW algorithm combines the normalization and temporal filtering procedures. When compared with the state-of-the-art robust features, such as the MVA and TSN features, the newly proposed SSW scheme reduces the number of feature frames by half (discarding HFC) while giving rise to recognition performance under various noisy situations, making it especially suitable for DSR systems. (3) SSW (feature-frame-wise compression) can be combined with PCM (element-wise compression) for further data compression. To our best knowledge, this work first time integrates the combination of feature-frame-wise and element-wise compressions. Furthermore, the results show that this combination may improve recondition performance, possibly due to a further suppression on rapid fluctuations of the signal envelopes caused by noise components. (4) SSW has been applied to conventional MFCC and FBANK features, as well as novel PNCC features, showing its ability of being used together with different front-ends. (5) SSW has shown promising recognition performances in both GMM-HMM and DNN-HMM acoustic models on both English and Chinese recognition tasks, and in noisy and noise-free environments confirming its outstanding adaptability and ease of integration for different scenarios. (6) SSW is implemented in a quite simple yet efficient manner since it involves only a statistics normalization process, the DWT and a first-order post-filter.

V. CONCLUSION

The present application developed a novel feature compression algorithm that was specifically designed to improve the data transmission efficiency with DSR architectures. The SSW approach prepares suppression by selecting wavelets to preserve only the most discriminative information in speech to transmit across the network for back-end recognizers. A comprehensive analysis showed SSW has the ability to achieve both high levels of recognition performance and effective data compression. The major findings of this work include: First, data compression analyses show SSW make the speech features more compact in size at the client. Second, evaluation results on various speech recognition tasks showed SSW improved the recognition performance across the server. Third, qualitative analysis using histograms and KL divergence showed SSW features possessed less statistical mismatches between training and testing phases compared to the unprocessed or other conventionally-processed features. Fourth, SSW is implemented in a quite simple and efficient manner since it involves only a statistics normalization process, the DWT and a post-filter. Finally, SSW can be combined with a element-wise compression technique to further compress data. In summary the results and analyses show SSW provides a suitable solution for portable devices and DSR systems. Further studies will investigate how to design better post-filters for the IDWT output and how to effectively reduce computation complexity. As DSR systems begin to integrate larger amounts of data from even more diverse sources, speech data compression will become increasingly important. Therefore, these SSW results for speech feature compression will remain applicable in this modern age of feature fusion and multimodal architectures.

VI. EMBODIMENTS

Figure 16:
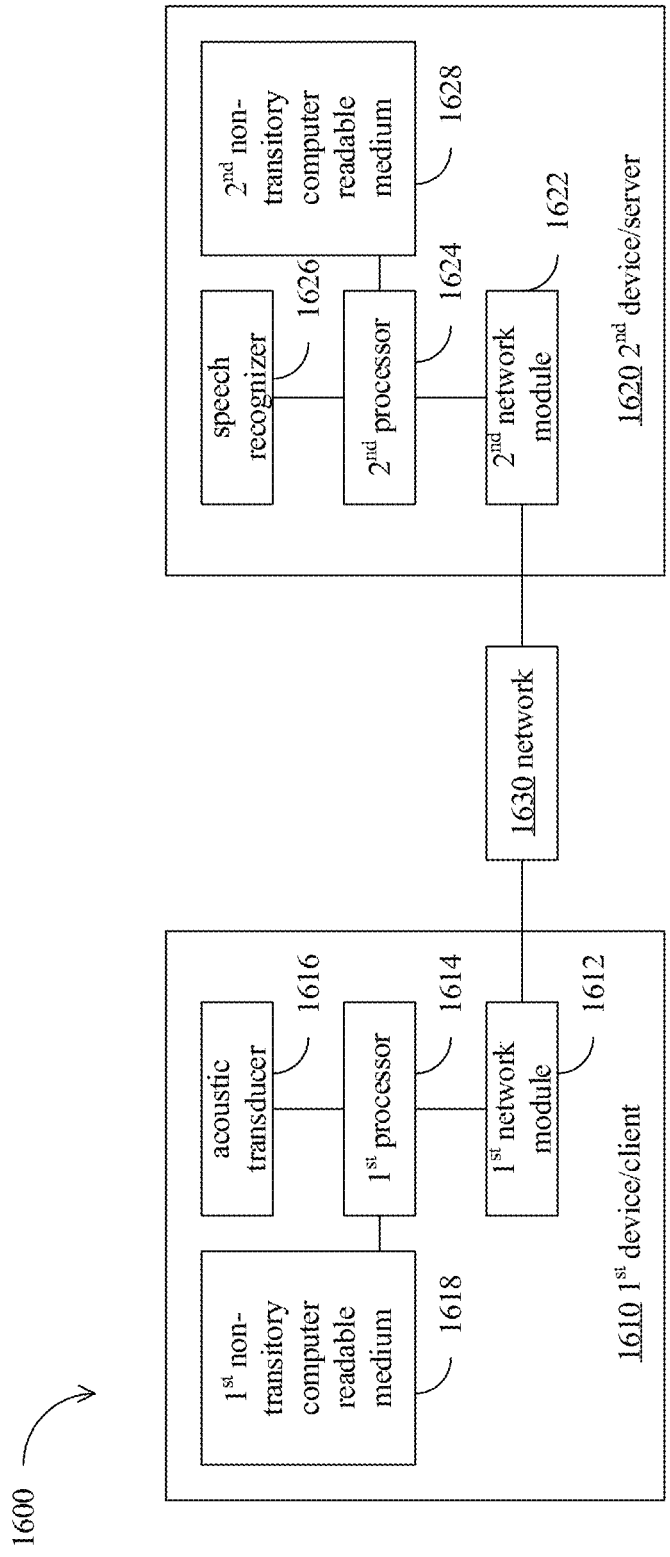
FIG. 16 depicts a schematic block diagram of a distributed speech recognition (DSR) system 1600 according to an embodiment of the present application.

Please refer to FIG. 16, which depicts a schematic block diagram of a distributed speech recognition (DSR) system 1600 according to an embodiment of the present application. The DSR system comprises at least one $1^{st}$ device or client device 1610, a $2^{nd}$ device or server device 1620 and a network 1630 connected to the $1^{st}$ device 1610 and the $2^{nd}$ device 1620. The $1^{st}$ device 1610 comprises a $1^{st}$ network module 1612 for connecting to the network 1630, a $1^{st}$ processor 1614, an acoustic transducer module 1616 and $1^{st}$ non-transitory computer readable medium 1618 coupled to the $1^{st}$ processor 1614. The $2^{nd}$ device 1620 comprises a $2^{nd}$ network module 1622 for connecting to the network 1630 and receiving data transmitted from the $1^{st}$ network module 1612 of the $1^{st}$ device 1610, a $2^{nd}$ processor 1624, a speech recognizer 1626 and $2^{nd}$ non-transitory computer readable medium 1628 coupled to the $2^{nd}$ processor 1624.

The acoustic transducer module 1616 is designed for recording speech and outputting frames of the recorded signal. The Pt processor 1614 is configured to read and execute instructions stored in the $1^{st}$ non-transitory computer readable medium 1618. The instructions stored in the $1^{st}$ non-transitory computer readable medium 1618 are programmed to implement a process or a method shown in FIG. 18. Similarly, the $2^{nd}$ processor 1624 is configured to read and execute instructions stored in the $2^{nd}$ non-transitory computer readable medium 1628. The instructions stored in the $2^{nd}$ non-transitory computer readable medium 1628 are programmed to implement a process or a method shown in FIG. 19. The speech recognizer 1626 is configured for recognizing the speech data sent from the $2^{nd}$ processor 1626 and outputting corresponding recognized result.

Figure 17:
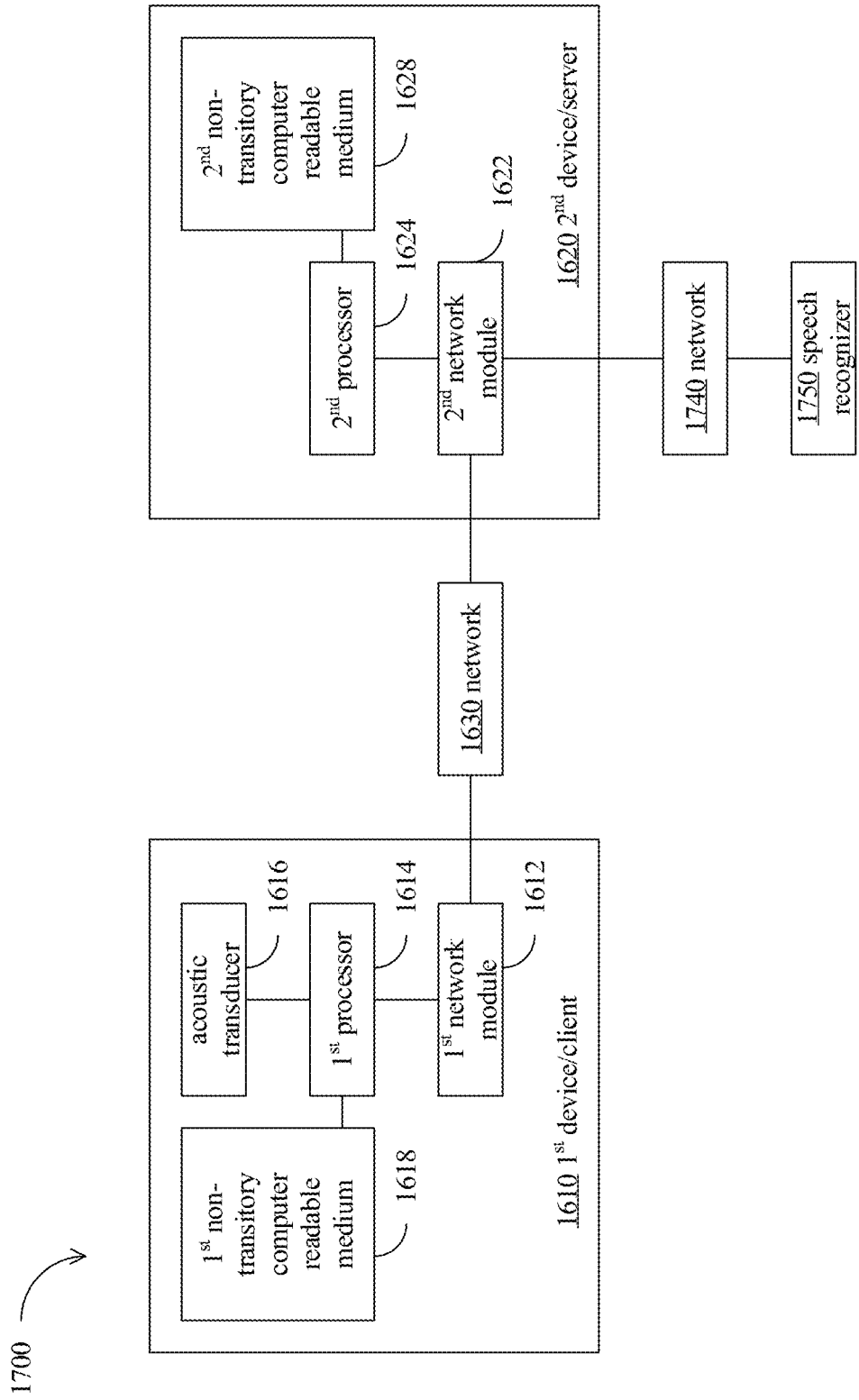
FIG. 17 depicts a schematic block diagram of another distributed speech recognition (DSR) system 1700 according to an embodiment of the present application.

Please refer to FIG. 17, which depicts a schematic block diagram of another distributed speech recognition (DSR) system 1700 according to an embodiment of the present application. Most of the embodiment shown in FIG. 17 is identical to the embodiment shown in FIG. 16, except for the speech recognizer. The system 1700 comprises an independent speech recognizer 1750 connected to the $2^{nd}$ device 1620 via another network 1740. The network 1630 may be public, such as Internet or Public Service Telephony Network (PSTN). The network 1740 may be private, such as Intranet. Since the computing resource required for the process implemented by the $2^{nd}$ processor 1624 is not comparable to the computing resource required for the speech recognizer, these two may be implemented in separate machines.

Please refer to FIG. 18, which illustrates a flowchart diagram of a method according to an embodiment of the present application. It may be implemented by the $1^{st}$ processor 1614 shown in FIGS. 16 and 17. The steps shown in FIG. 18 are described below:

Step 1810: extracting multiple-dimensional speech features from frames of recorded speech signal to generate multiple feature sequences. The extracting comprises performing one of the following algorithms to generate multiple feature sequences: power-normalized cepstral coefficients (PNCC) algorithm; filter-bank (FBANK) algorithm; and Mel-frequency cepstral coefficients (MFCCs) algorithm.

Step 1820: applying discrete wavelet transform (DWT) to the feature sequences to obtain at least one of a plurality of component data. In one example, the DWT further comprises: passing the feature sequences through a low-pass analysis filter to generate analyzed LFC data; and down-sampling the analyzed LFC data with a factor of two to generate the at least one of the plurality of component data. In another embodiment, the DWT further comprises: passing the feature sequences through multiple analysis filters to generate multiple analyzed component data; and down-sampling the multiple analyzed component data to generate at least two of the plurality of component data. A factor of the down-sampling equals to the number of the plurality of component data.

Optional Step 1830: compressing element-wisely the at least one of the plurality of component data. In one example, the compressing technique comprises one of the following: pulse code modulation (PCM); and codebook-based modulation.

Step 1840: transmitting the at least one of the plurality of component data via a network to a receiving computer, wherein another one of the plurality of component data is not transmitted.

Please refer to FIG. 19, which illustrates a flowchart diagram of a method according to an embodiment of the present application. It may be implemented by the $2^{nd}$ processor 1624 shown in FIGS. 16 and 17. The steps shown in FIG. 19 are described below:

Optional Step 1910: uncompressing element-wisely the received data. In one example, the uncompressing technique comprises one of the following: pulse code modulation (PCM); and codebook-based modulation.

Step 1920: updating received data, received by a network module of the computer, via a temporal filtering and/or statistics normalization to generate an updated data.

Step 1930: applying inverse discrete wavelet transform (IDWT) to the updated data to obtain reconstructed speech data. In one example, the IDWT further comprises: up-sampling the updated data with a factor of two to generated up-sampling updated data; and passing the up-sampling updated data through a low-pass synthesis filter to obtain reconstructed speech data, wherein the low-pass synthesis filter is corresponding to the low-pass analysis filter. In another example, the IDWT further comprises: up-sampling the updated data to generated up-sampling updated data; and passing the up-sampling updated data through multiple synthesis filters to obtain reconstructed speech data, wherein each of the synthesis filters are corresponding to one of the analysis filters. A factor of the down-sampling equals to a factor of the up-sampling and the number of the plurality of component data.

Optional Step 1940: applying a post filter to the reconstructed speech data to compensate the component data which is not transmitted from over-smoothing.

Step 1950: sending the reconstructed speech data to a speech recognizer for speech recognition.

Step 1960: receiving speech recognized result from the speech recognizer.

Step 1970: forwarding the speech result to a sender ($1^{st}$ device) which transmitted the received data via the network module.

The reference citations mentioned above can be found in the specification of the provisional patent application 62/644,660.

In accordance with an embodiment, the present application provides a system comprising a first device and a second device. The first device comprises a first network module for connecting to a network; an acoustic transducer module for recording speech and outputting frames of the recorded signal; and a first processor configured for the following: extracting multiple-dimensional speech features from the frames of the recorded signal to generate multiple feature sequences; applying discrete wavelet transform (DWT) to the feature sequences to obtain at least one of a plurality of component data; and transmitting the at least one of the plurality of component data via the network, wherein another one of the plurality of component data is not transmitted. The second device comprises a second network module for connecting the network and receiving the at least one of the plurality of component data from the first device; and a second processor configured for the following: updating the received data to generate a updated data; and applying inverse discrete wavelet transform (IDWT) to the updated data to obtain reconstructed speed data.

In this system, wherein the second processor is further configured for applying a post filter to the reconstructed speech data to compensate the component data which is not transmitted from over-smoothing.

This system further comprises a speech recognizer for receiving the reconstructed speech data from the second device and outputting speech recognized result to the first device via the network.

In this system, wherein the plurality of component data comprises low frequency-modulation component (LFC) data and high-frequency modulation component (HFC) data. In this system, wherein the LFC data is transmitted and the HFC data is not transmitted.

In this system, wherein the DWT further comprises: passing the feature sequences through a low-pass analysis filter to generate analyzed LFC data; and down-sampling the analyzed LFC data with a factor of two to generate the at least one of the plurality of component data, wherein the IDWT further comprises: up-sampling the updated data with a factor of two to generated up-sampling updated data; and passing the up-sampling updated data through a low-pass synthesis filter to obtain reconstructed speech data, wherein the low-pass synthesis filter is corresponding to the low-pass analysis filter.

In this system, wherein the DWT further comprises: passing the feature sequences through multiple analysis filters to generate multiple analyzed component data; and down-sampling the multiple analyzed component data to generate at least two of the plurality of component data, and wherein the IDWT further comprises: up-sampling the updated data to generated up-sampling updated data; and passing the up-sampling updated data through multiple synthesis filters to obtain reconstructed speech data, wherein each of the synthesis filters are corresponding to one of the analysis filters. In this system, wherein a factor of the down-sampling equals to a factor of the up-sampling and the number of the plurality of component data.

In this system, wherein the extracting comprises performing one of the following algorithms to generate multiple feature sequences: power-normalized cepstral coefficients (PNCC) algorithm; filter-bank (FBANK) algorithm; and Mel-frequency cepstral coefficients (MFCCs) algorithm.

In this system, wherein the first processor is further configured for compressing element-wisely the at least one of the plurality of component data before the transmitting, and wherein the second processor is further configured for corresponding uncompressing element-wisely the received data before the updating.

In this system, wherein the compressing and uncompressing techniques comprise one of the following: pulse code modulation (PCM); and codebook-based modulation.

In this system, wherein the second processor is further configured for detecting and repairing errors on the received data before the updating.

In accordance with an embodiment, a non-transitory computer readable medium caused a computer to execute a process, wherein the process comprising: extracting multiple-dimensional speech features from frames of recorded speech signal to generate multiple feature sequences; applying discrete wavelet transform (DWT) to the feature sequences to obtain at least one of a plurality of component data; and transmitting the at least one of the plurality of component data via a network to a receiving computer, wherein another one of the plurality of component data is not transmitted.

In this embodiment, wherein the plurality of component data comprises low frequency-modulation component (LFC) data and high-frequency modulation component (HFC) data. In this embodiment, wherein the LFC data is transmitted and the HFC data is not transmitted.

In this embodiment, wherein the DWT further comprises: passing the feature sequences through a low-pass analysis filter to generate analyzed LFC data; and down-sampling the analyzed LFC data with a factor of two to generate the at least one of the plurality of component data.

In this embodiment, wherein the DWT further comprises: passing the feature sequences through multiple analysis filters to generate multiple analyzed component data; and down-sampling the multiple analyzed component data to generate at least two of the plurality of component data. In this embodiment, wherein a factor of the down-sampling equals to the number of the plurality of component data.

In this embodiment, wherein the extracting comprises performing one of the following algorithms to generate multiple feature sequences: power-normalized cepstral coefficients (PNCC) algorithm; filter-bank (FBANK) algorithm; and Mel-frequency cepstral coefficients (MFCCs) algorithm.

In this embodiment, wherein the process further comprises compressing element-wisely the at least one of the plurality of component data before the transmitting.

In this embodiment, wherein the compressing technique comprises one of the following: pulse code modulation (PCM); and codebook-based modulation.

In accordance with one embodiment, the present application comprising: extracting multiple-dimensional speech features from frames of recorded speech signal to generate multiple feature sequences; applying discrete wavelet transform (DWT) to the feature sequences to obtain at least one of a plurality of component data; and transmitting the at least one of the plurality of component data via a network to a receiving computer, wherein another one of the plurality of component data is not transmitted.

In this embodiment, wherein the plurality of component data comprises low frequency-modulation component (LFC) data and high-frequency modulation component (HFC) data. In this embodiment, wherein the LFC data is transmitted and the HFC data is not transmitted.

In this embodiment, wherein the DWT further comprises: passing the feature sequences through a low-pass analysis filter to generate analyzed LFC data; and down-sampling the analyzed LFC data with a factor of two to generate the at least one of the plurality of component data.

In this embodiment, wherein the DWT further comprises: passing the feature sequences through multiple analysis filters to generate multiple analyzed component data; and down-sampling the multiple analyzed component data to generate at least two of the plurality of component data. In this embodiment, wherein a factor of the down-sampling equals to the number of the plurality of component data.

In this embodiment, wherein the extracting comprises performing one of the following algorithms to generate multiple feature sequences: power-normalized cepstral coefficients (PNCC) algorithm; filter-bank (FBANK) algorithm; and Mel-frequency cepstral coefficients (MFCCs) algorithm.

In this embodiment, wherein the first processor is further configured for compressing element-wisely the at least one of the plurality of component data before the transmitting, and wherein the second processor is further configured for corresponding uncompressing element-wisely the received data before the updating. In this embodiment, wherein the compressing technique comprises one of the following: pulse code modulation (PCM); and codebook-based modulation.

In accordance with an embodiment, the present application provides a non-transitory computer readable medium caused a computer to execute a process, wherein the process comprising: updating received data, received by a network module of the computer to generate an updated data; and applying inverse discrete wavelet transform (IDWT) to the updated data to obtain reconstructed speech data, wherein the received data comprises at least one of a plurality of component data generated by discrete wavelet transform (DWT) from multiple feature sequences which are extracted from frames of recorded speech signal, wherein another one of the plurality of component data is not received.

In this embodiment, wherein the process further comprises applying a post filter to the reconstructed speech data to compensate the component data which is not transmitted from over-smoothing.

In this embodiment, wherein the process further comprises: sending the reconstructed speech data to a speech recognizer for speech recognition; receiving speech recognized result from the speech recognizer; and forwarding the speech result to a sender which transmitted the received data via the network module.

In this embodiment, wherein the plurality of component data comprises low frequency-modulation component (LFC) data and high-frequency modulation component (HFC) data. In this embodiment, wherein the LFC data is transmitted and the HFC data is not transmitted.

In this embodiment, wherein the IDWT further comprises: up-sampling the updated data with a factor of two to generated up-sampling updated data; and passing the up-sampling updated data through a low-pass synthesis filter to obtain reconstructed speech data, wherein the low-pass synthesis filter is corresponding to a low-pass analysis filter used in the DWT.

In this embodiment, wherein the IDWT further comprises: up-sampling the updated data to generated up-sampling updated data; and passing the up-sampling updated data through multiple synthesis filters to obtain reconstructed speech data, wherein each of the synthesis filters are corresponding to one of analysis filters used in the DWT. In this embodiment, wherein a factor of the up-sampling equals to the number of the plurality of component data.

In this embodiment, wherein the process further comprises uncompressing element-wisely the received data before the updating. In this embodiment, wherein the uncompressing technique comprises one of the following: pulse code modulation (PCM); and codebook-based modulation.

In this embodiment, wherein the process further comprises detecting and repairing errors on the received data before the updating.

In accordance with an embodiment, the present application provides a method comprising: updating received data, received by a network module of the computer to generate an updated data; and applying inverse discrete wavelet transform (IDWT) to the updated data to obtain reconstructed speech data, wherein the received data comprises at least one of a plurality of component data generated by discrete wavelet transform (DWT) from multiple feature sequences which are extracted from frames of recorded speech signal, wherein another one of the plurality of component data is not received.

In this embodiment, the method further comprises applying a post filter to the reconstructed speech data to compensate the component data which is not transmitted from over-smoothing.

In this embodiment, the method further comprises sending the reconstructed speech data to a speech recognizer for speech recognition; receiving speech recognized result from the speech recognizer; and forwarding the speech result to a sender which transmitted the received data via the network module.

In this embodiment, wherein the plurality of component data comprises low frequency-modulation component (LFC) data and high-frequency modulation component (HFC) data. In this embodiment, wherein the LFC data is transmitted and the HFC data is not transmitted.

In this embodiment, wherein the IDWT further comprises: up-sampling the updated data with a factor of two to generated up-sampling updated data; and passing the up-sampling updated data through a low-pass synthesis filter to obtain reconstructed speech data, wherein the low-pass synthesis filter is corresponding to a low-pass analysis filter used in the DWT.

In this embodiment, wherein the IDWT further comprises: up-sampling the updated data to generated up-sampling updated data; and passing the up-sampling updated data through multiple synthesis filters to obtain reconstructed speech data, wherein each of the synthesis filters are corresponding to one of analysis filters used in the DWT. In this embodiment, wherein a factor of the up-sampling equals to the number of the plurality of component data.

In this embodiment, the method further comprises uncompressing element-wisely the received data before the updating. In this embodiment, wherein the uncompressing technique comprises one of the following: pulse code modulation (PCM); and codebook-based modulation.

In this embodiment, the method further comprises detecting and repairing errors on the received data before the updating.

In accordance with an embodiment, the present application provides a device, comprising: a second network module for connecting to a network and receiving the at least one of the plurality of component data from a first device; and a second processor configured for the following: updating the received data to generate an updated data; and applying inverse discrete wavelet transform (IDWT) to the updated data to obtain reconstructed speech data, wherein the received data comprises at least one of a plurality of component data generated by discrete wavelet transform (DWT) from multiple feature sequences which are extracted from frames of recorded speech signal, wherein another one of the plurality of component data is not received.

In this embodiment, wherein the second processor is further configured for applying a post filter to the reconstructed speech data to compensate the component data which is not transmitted from over-smoothing.

In this embodiment, wherein the second processor is further configured for: sending the reconstructed speech data to a speech recognizer for speech recognition; receiving speech recognized result from the speech recognizer; and forwarding the speech result to a sender which transmitted the received data via the second network module.

In this embodiment, wherein the plurality of component data comprises low frequency-modulation component (LFC) data and high-frequency modulation component (HFC) data. In this embodiment, wherein the LFC data is transmitted and the HFC data is not transmitted.

In this embodiment, wherein the IDWT further comprises: up-sampling the updated data with a factor of two to generated up-sampling updated data; and passing the up-sampling updated data through a low-pass synthesis filter to obtain reconstructed speech data, wherein the low-pass synthesis filter is corresponding to a low-pass analysis filter used in the DWT.

In this embodiment, wherein the IDWT further comprises: up-sampling the updated data to generated up-sampling updated data; and passing the up-sampling updated data through multiple synthesis filters to obtain reconstructed speech data, wherein each of the synthesis filters are corresponding to one of analysis filters used in the DWT. In this embodiment, wherein a factor of the up-sampling equals to the number of the plurality of component data.

In this embodiment, wherein the second processor is further configured for uncompressing element-wisely the received data before the updating. In this embodiment, wherein the uncompressing technique comprises one of the following: pulse code modulation (PCM); and codebook-based modulation.

In this embodiment, the second processor is further configured for detecting and repairing errors on the received data before the updating.

The above embodiments are only used to illustrate the principles of the present invention, and they should not be construed as to limit the present invention in any way. The above embodiments can be modified by those with ordinary skill in the art without departing from the scope of the present invention as defined in the following appended claims.

What is claimed is:

1. A system, comprising:
   a first device, comprising:
   a first network module for connecting to a network;
   an acoustic transducer module for recording speech and outputting frames of recorded signal; and
   a first processor configured for the following:
   extracting multiple-dimensional speech features from the frames of the recorded signal to generate multiple feature sequences;
   applying discrete wavelet transform (DWT) to the feature sequences to obtain a plurality of component data; and
   transmitting at least one of the plurality of component data via the network, wherein another one of the plurality of component data is not transmitted; and
   a second device, comprising:
   a second network module for connecting to the network and receiving the at least one of the plurality of component data from the first device; and a second processor configured for the following:
   updating the received data to generate an updated data by using a zero sequence as the another one of the plurality of component data which is not transmitted; and
   applying inverse discrete wavelet transform (IDWT) to the updated data to obtain reconstructed speech data.

2. The system of claim 1, wherein the second processor is further configured for applying a post filter to the reconstructed speech data to compensate the component data which is not transmitted from over-smoothing.

3. The system of claim 1, further comprises a speech recognizer for receiving the reconstructed speech data from the second device and outputting speech recognized result to the first device via the network.

4. The system of claim 1, wherein some of the plurality of component data are transmitted and the others of the plurality of component data are not transmitted.

5. The system of claim 1,
   wherein the DWT further comprises:
   passing the feature sequences through multiple analysis filters to generate multiple analyzed component data, respectively; and
   down-sampling the multiple analyzed component data to generate at least two of the plurality of component data, and
   wherein the IDWT further comprises:
   up-sampling the updated data to generate up-sampling updated data; and
   passing the up-sampling updated data through multiple synthesis filters to obtain the reconstructed speech data,
   wherein each of the synthesis filters are corresponding to one of the analysis filters,
   wherein a factor of the down-sampling equals to a factor of the up-sampling and the number of the plurality of component data.

6. The system of claim 1, wherein the updating comprises performing at least one of temporal filtering and statistics normalization to generate the updated data.

7. The system of claim 1,
   wherein the first processor is further configured for compressing element-wisely the at least one of the plurality of component data before the transmitting, and
   wherein the second processor is further configured for correspondingly uncompressing element-wisely the received data before the updating.

8. The system of claim 1, wherein the second processor is further configured for detecting and repairing errors on the received data before the updating.

9. A method, comprising:
   recording speech and outputting frames of recorded signal by an acoustic transducer module;
   extracting multiple-dimensional speech features from the frames of the recorded signal to generate multiple feature sequences;
   applying discrete wavelet transform (DWT) to the feature sequences to obtain a plurality of component data; and
   transmitting at least one of the plurality of component data via a network to a receiving computer by a first network module, wherein another one of the plurality of component data is not transmitted;
   updating the received data to generate an updated data by using a zero sequence as the another one of the plurality of component data which is not transmitted.

10. The method of claim 9, wherein some of the plurality of component data are transmitted and the others of the plurality of component data are not transmitted.

11. The method of claim 9, wherein the DWT further comprises:
    passing the feature sequences through multiple analysis filters to generate multiple analyzed component data, respectively; and
    down-sampling the multiple analyzed component data to generate at least two of the plurality of component data,
    wherein a factor of the down-sampling equals to a factor of the up-sampling and the number of the plurality of component data.

12. The method of claim 9, further comprises compressing element-wisely the at least one of the plurality of component data before the transmitting.

13. A method, comprising:
    receiving data by a second network module from a transmitting computer;
    updating the received data to generate an updated data by using a zero sequence as the another one of the plurality of component data which is not transmitted; and
    applying inverse discrete wavelet transform (IDWT) to the updated data to obtain reconstructed speech data,
    wherein the received data comprises at least one of a plurality of component data generated by discrete wavelet transform (DWT) from multiple feature sequences, which are extracted from frames of recorded speech signal, wherein another one of the plurality of component data is not transmitted.

14. The method of claim 13, further comprises at least one of the following steps:
    uncompressing element-wisely the received data before the updating;
    detecting and repairing errors on the received data before the updating;
    applying a post filter to the reconstructed speech data to compensate the component data which is not transmitted from over-smoothing; and
    sending the reconstructed speech data to a speech recognizer for speech recognition.

15. The method of claim 13, wherein some of the plurality of component data are transmitted and the others of the plurality of component data are not transmitted.

16. The method of claim 13, wherein the IDWT further comprises:
- up-sampling the updated data to generate up-sampling updated data; and
- passing the up-sampling updated data through multiple synthesis filters to obtain the reconstructed speech data,
- wherein each of the synthesis filters are corresponding to one of analysis filters,
- wherein a factor of the down-sampling equals to a factor of the up-sampling and the number of the plurality of component data.

17. The method of claim 13, wherein the updating comprises performing at least one of temporal filtering and statistics normalization to generate the updated data.

\* \* \* \* \*